US011768692B2

(12) United States Patent
Qiao et al.

(10) Patent No.: US 11,768,692 B2
(45) Date of Patent: Sep. 26, 2023

(54) SYSTEMS AND METHODS FOR AUTOMATED APPLICATION LAUNCHING

(71) Applicant: Citrix Systems, Inc., Fort Lauderdale, FL (US)

(72) Inventors: Zongpeng Qiao, Nanjing (CN); Yedong Yu, Nanjing (CN); Ze Chen, Nanning (CN)

(73) Assignee: Citrix Systems, Inc., Fort Lauderdale, FL (US)

(*) Notice: Subject to any disclaimer, the term of this patent is extended or adjusted under 35 U.S.C. 154(b) by 16 days.

(21) Appl. No.: 16/738,321

(22) Filed: Jan. 9, 2020

(65) Prior Publication Data
US 2021/0165662 A1 Jun. 3, 2021

Related U.S. Application Data

(63) Continuation of application No. PCT/CN2019/122312, filed on Dec. 2, 2019.

(51) Int. Cl.
G06F 17/00 (2019.01)
G06F 9/445 (2018.01)
(Continued)

(52) U.S. Cl.
CPC ............ G06F 9/445 (2013.01); G06F 40/205 (2020.01); G06F 40/56 (2020.01); G06Q 10/06314 (2013.01)

(58) Field of Classification Search
CPC ........ G06F 9/445; G06F 40/56; G06F 40/205; G06Q 10/06314; G06Q 10/107; H04L 51/18; H04L 51/00; H04L 51/08
(Continued)

(56) References Cited

U.S. PATENT DOCUMENTS 5,745,692 A * 4/1998 Lohmann, II ........... H04L 41/06
                                                          709/219
5,864,848 A * 1/1999 Horvitz ................. G06F 40/274
                                                          707/999.102
(Continued)

FOREIGN PATENT DOCUMENTS

CN   101866294 A   10/2010
CN   105511880 A    4/2016
CN   109660675 A    4/2019

OTHER PUBLICATIONS

Fischer, J.,"How to Control Your Computer Remotely via Email," (archived Dec. 22, 2016), downloaded from Wayback Machine, 18 pages.*
(Continued)

Primary Examiner — Cesar B Paula
Assistant Examiner — James H. Blackwell

(57) ABSTRACT

Methods and systems for automated application launching are described herein. A computing device may receive a message, the message indicative of an application for a given event and a time in which to launch the application for the given event, from a client device. Based on the content of the message, the computing device may generate a plurality of text strings based on content of the message. The computing device may identify the application based on a comparison of the plurality of text strings with one or more entries of a database of applications and may launch the application in response to the identification of the application and at the time indicated in the received message, so as to make ready the application for use for the given event.

18 Claims, 14 Drawing Sheets

(51) Int. Cl.
  *G06F 40/205* (2020.01)
  *G06F 40/56* (2020.01)
  *G06Q 10/0631* (2023.01)
(58) Field of Classification Search
  USPC .................................................. 718/102
  See application file for complete search history.

(56) References Cited

U.S. PATENT DOCUMENTS

| | | | | |
|---|---|---|---|---|
| 5,937,160 A * | 8/1999 | Davis | G06F 16/9558 | 709/203 |
| 6,237,026 B1 * | 5/2001 | Prasad | H04L 12/1813 | 709/227 |
| 6,343,311 B1 * | 1/2002 | Nishida | G06F 9/547 | 709/203 |
| 6,363,352 B1 * | 3/2002 | Dailey | G06Q 10/109 | 715/202 |
| 6,374,406 B2 * | 4/2002 | Hirata | G06Q 10/107 | 725/132 |
| 6,449,343 B1 * | 9/2002 | Henderson | H04M 3/5322 | 379/88.14 |
| 6,697,942 B1 * | 2/2004 | L'Heureux | H04L 51/18 | 380/238 |
| 6,741,855 B1 * | 5/2004 | Martin | H04L 29/08846 | 455/412.1 |
| 6,769,120 B1 * | 7/2004 | Rodriguez | G06Q 10/109 | 455/418 |
| 6,792,321 B2 * | 9/2004 | Sepe, Jr. | G05B 15/02 | 700/65 |
| 6,925,481 B2 * | 8/2005 | Singhal | H04L 29/06 | 709/200 |
| 6,934,738 B1 * | 8/2005 | Furusawa | G06Q 10/107 | 710/244 |
| 7,127,491 B2 * | 10/2006 | Zirnstein, Jr. | G06F 9/546 | 709/206 |
| 7,191,223 B1 * | 3/2007 | Zamir | H04L 12/1813 | 709/207 |
| 7,249,171 B2 * | 7/2007 | Goto | G06Q 10/06 | 709/223 |
| 7,286,840 B2 * | 10/2007 | Jain | H04W 88/184 | 455/412.1 |
| 7,499,535 B1 * | 3/2009 | Ivory | H04M 3/56 | 379/202.01 |
| 7,711,785 B2 * | 5/2010 | Arnold | G06Q 10/107 | 709/206 |
| 7,886,026 B2 * | 2/2011 | Haines | G06K 15/1805 | 709/220 |
| 8,744,424 B2 * | 6/2014 | Kamiya | G06F 21/64 | 455/418 |
| 9,049,257 B2 * | 6/2015 | Soundararajan | G06F 9/45512 | |
| 9,760,868 B2 * | 9/2017 | Ju | G06Q 10/107 | |
| 10,958,457 B1 * | 3/2021 | Davis | G06Q 10/1095 | |
| 2001/0003827 A1 * | 6/2001 | Shimamura | H04L 41/00 | 709/206 |
| 2002/0019851 A1 * | 2/2002 | Pollack | G06F 16/10 | 709/206 |
| 2003/0060900 A1 * | 3/2003 | Lo | G05B 23/027 | 700/19 |
| 2004/0019643 A1 * | 1/2004 | Zirnstein, Jr. | G06F 9/546 | 709/206 |
| 2006/0276208 A1 * | 12/2006 | Jain | H04W 88/184 | 455/466 |
| 2007/0011261 A1 * | 1/2007 | Madams | G06F 15/16 | 709/207 |
| 2008/0004053 A1 * | 1/2008 | Kim | H04L 51/12 | 455/466 |
| 2008/0162923 A1 * | 7/2008 | Arnold | G06Q 10/107 | 713/150 |
| 2008/0208899 A1 * | 8/2008 | Motoyama | H04L 67/025 | |
| 2009/0235280 A1 * | 9/2009 | Tannier | G06Q 10/00 | 719/318 |
| 2010/0010994 A1 * | 1/2010 | Wittig | G06F 16/176 | 707/E17.039 |
| 2011/0149809 A1 * | 6/2011 | Narayanaswamy | H04N 7/15 | 379/202.01 |
| 2011/0320973 A1 * | 12/2011 | Yu | G06Q 10/109 | 715/772 |
| 2013/0097250 A1 * | 4/2013 | Zion | H04L 12/6418 | 709/206 |
| 2013/0159428 A1 * | 6/2013 | Soundararajan | G06F 9/45533 | 709/206 |
| 2015/0160951 A1 * | 6/2015 | Iyengar | H04L 67/04 | 715/712 |
| 2015/0163186 A1 * | 6/2015 | Tian | H04L 67/10 | 709/206 |
| 2015/0188871 A1 * | 7/2015 | Lewis | H04L 51/24 | 709/207 |
| 2015/0200875 A1 * | 7/2015 | Khvostichenko | H04L 51/12 | 709/206 |
| 2016/0373490 A1 * | 12/2016 | Sedar | G06Q 10/1095 | |
| 2017/0006162 A1 * | 1/2017 | Bargetzi | H04W 4/06 | |

OTHER PUBLICATIONS

Skarin, P., "MailExer: Remote Control Computer by Email," (2019), 3 pages.*

Anonymous, "System and Method to Automatically Launch Meeting Tools," Jul. 29, 2010, ip.com Prior Art Database Technical Disclosure, 2 pages. (Year: 2010).*

Anonymous, "Method and System for Automatically Executing Required Steps and Applications for Launching Meetings," Jul. 21, 2010, ip.com Prior Art Database Technical Disclosure, 3 pages. (Year: 2010).*

Anonymous, "Pre-Launching Applications or Documents when Calendar Event Approaches," May 20, 2013, ip.com Prior Art Database Technical Disclosure, 2 pages. (Year: 2013).*

Lu, H. et al., "Automatically Launching a Meeting Application at Scheduled Meeting Time," Apr. 19, 2013, Cisco Systems, ip.com Prior Art Database Technical Disclosure, 8 pages. (Year: 2013).*

Corston-Oliver, Simon & Ringger, Eric & Gamon, Michael & Campbell, Richard. (2004). Task-focused summarization of email.*

Aug. 27, 2020—(WO) International Search Report and Written Opinion—App No. PCT/CN2019/122312.

"Bag-of-words model" https://en.wikipedia.org/wiki/Bag-of-words_model website visited Jan. 9, 2020, pp. 1-6.

* cited by examiner

SYSTEMS AND METHODS FOR AUTOMATED APPLICATION LAUNCHING

CROSS-REFERENCE TO RELATED APPLICATIONS

The present application claims priority to International Application No. PCT/CN2019/122312, filed Dec. 2, 2019, and entitled, "Systems and Methods for Automated Application Launching," which is hereby incorporated by reference as to its entirety.

FIELD

Aspects described herein generally relate to computer networking, remote computer access, virtualization, enterprise mobility management, and hardware and software related thereto. More specifically, one or more aspects describe herein provide systems and methods for automated application launching.

BACKGROUND

Many organizations and individuals rely on a combined email and calendar application to manage daily tasks and/or meetings. In some instances, such applications may be configured to send meeting invitations or compile a task list, which may be formatted with relevant attachments. Thus, it may be important to launch software to access and view the relevant attachments during or prior to the meeting or scheduled task completion time.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

In many instances, however, individuals may forget to load attachments/software in advance, and may waste valuable time trying to find, launch, and/or log in once a meeting or task window has already begun. Furthermore, existing technologies fail to have a mechanism configured to identify events, and corresponding resources for the events, and to proactively launch applications to facilitate accomplishment of the identified events. Accordingly, a user experience for multiple meeting participants may be disrupted while unprepared participants launch the software/attachments. There remains an ever present need to improve integration between an individual's schedule and relevant applications.

To overcome limitations in the prior art described above, and to overcome other limitations that will be apparent upon reading and understanding the present specification, aspects described herein are directed towards systems and methods for automated application launching.

In one or more embodiments, a computing device including at least one processor and a memory storing computer readable instructions may, receive a message, indicative of an application for a given event and a time in which to launch the application for the given event, from a client device. Based on content of the message, the computing device may generate a plurality of text strings. Based on a comparison of the plurality of text strings with one or more entries of a database of applications, the computing device may identify the application. In response to the identification of the application and at the time indicated in the received message, the computing device may launch the application so as to make ready the application for use for the given event.

In one or more embodiments, generation of the plurality of text strings may include use of a combination of text from a subject line of the message and text from a body of the message to form at least one text string. In one or more embodiments, the message may be one of: an email message, a text message, a meeting invitation, an electronic task alert, or an email attachment.

In one or more embodiments, the system may remove duplicate text strings from the plurality of text strings. In one or more embodiments, the system may determine a match between at least one text string of the plurality of text strings and an entry of the database of applications, where the match is indicative of the application.

In one or more embodiments, the system may determine that at least one text string does not exactly match any of the entries of the database of applications. Based on a comparison of a portion of at least one text string with at least one entry of the database of applications, the system may determine a partial match of the at least one text string with an entry of the database of applications. In one or more embodiments, identification of the application may be based on a partial match of at least one text string with an entry of the database of applications.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
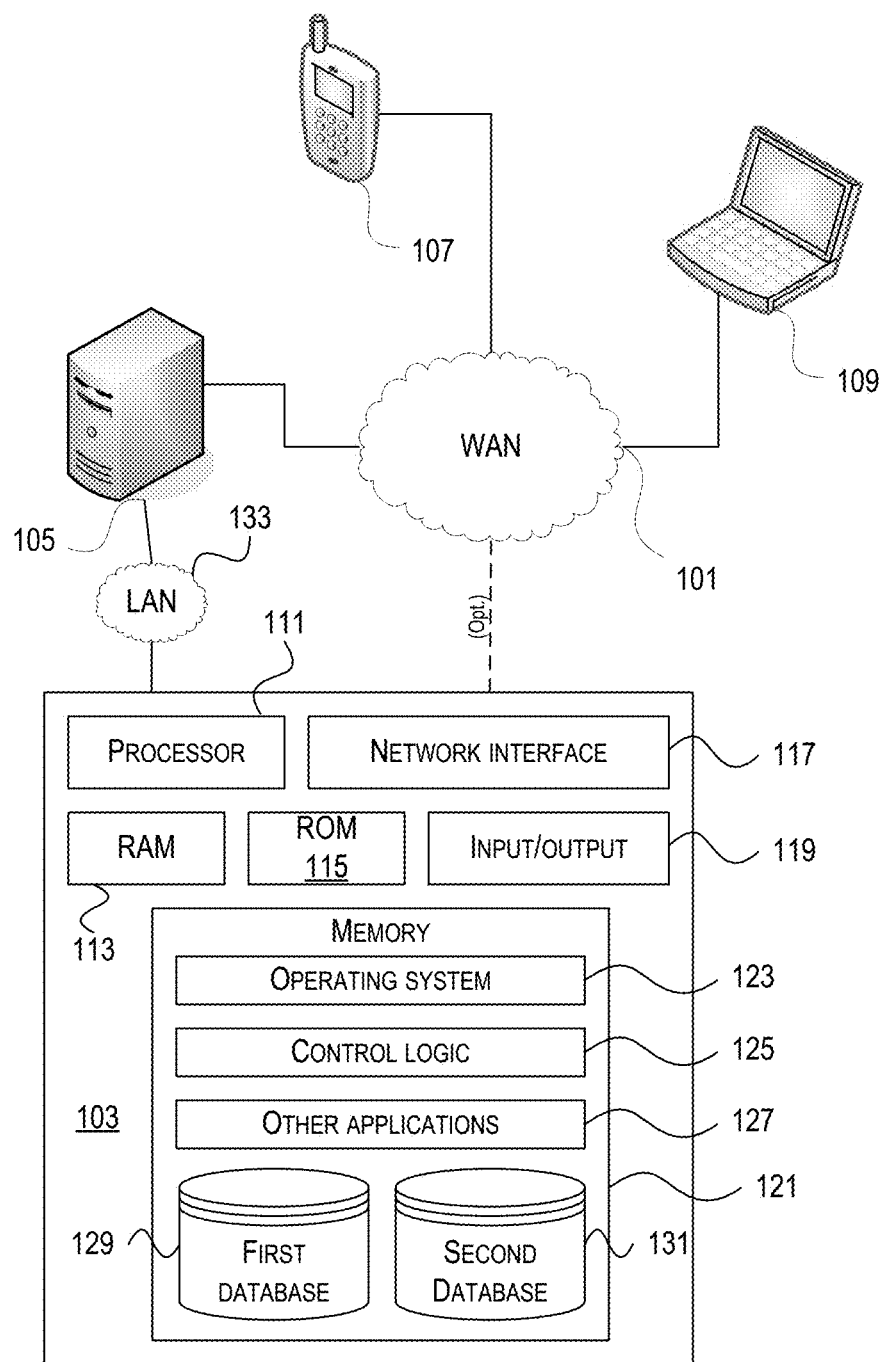
FIG. 1 depicts an illustrative computer system architecture that may be used for automated application launching and in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards an extraction plug-in and trigger service that may be implemented to automate application launching based on an identified application and an event trigger. For example, annotation of work, tasks, events, meetings, or the like can be done with use of a calendar via one or more computing programs. In some collaboration scenarios, a manager or fellow may schedule a meeting or a to-do event for an individual in his or her calendar, and the individual may follow the scheduled actions to finish tasks one by one. There are, however, drawbacks to this approach. For example, when dealing with a task that involves opening an application, an individual may need to search within a workspace to find the specific application, open it, log into it, or the like. Such necessary processes are especially frustrating when internet connections and/or network bandwidth are slow. As a particular example, if an individual is hosting a virtual meeting, but is absorbed in another task until realizing that the meeting is about to start, the individual must rush to find the virtual meeting application, and belatedly start the meeting, and apologize for the delay. Furthermore, in some instances, individuals may need to switch between multiple applications to determine what tasks to perform next (e.g., close down a word processing file to launch the task list and then launch a slideshow application to begin a subsequent task). As another example, an individual may need to close a virtual meeting application to launch an email application to determine the subject of a given virtual meeting, and then must launch one or more applications related to that subject (e.g., documents, spreadsheets, slide decks, or the like). Accordingly, such toggling between applications may negatively affect a user experience. This disclosure describes methods and systems to address the shortcomings described above effectively and automatically, while making the procedure more simple and convenient for customers to experience. For example, the disclosure describes a way to extract a key application and related time slot, and then to do the repeatable and automatable work for the customer, thus provides a technical improvement in facilitating enhanced user experiences with virtual meetings, task lists, stored calendars, or the like that eliminate time spent trying to manually determine, log in, and launch an application relevant to the user experience.

At a high level, actions can be extracted from messages (e.g., automatically from email). In one or more instances, extracting an action may comprise extracting a specific application at a specific time that includes two parts: what to do and when to do it. For example, the action extracted may be to launch a series of two links on Jun. 19, 2019, at 11:00 AM. After extracting the action, the action may be uploaded to a service that manages all the submitted actions from all kinds of applications. This service may initiate performance of the extracted action at the time indicated by the message. For instance, the service may launch applications in the background of an enterprise user device (e.g., enterprise user device 710, second enterprise user device 730, or the like) prior to the start of a virtual or non-virtual meeting. As another example, the service may generate a daily work list together with other actions from other applications to give an individual a clear perspective about his or her daily workload, and may automatically launch the applications at an appropriate time. It should be understood that these examples are not the only available use cases, and that the systems and methods described herein may apply to a wide variety of use cases.

To accomplish the extraction of actions, message data may be collected and used to train a text classification model. For example, an action extraction plugin may be developed and configured for implementation within an email and/or calendar application on an enterprise user device (e.g., first enterprise user device 710, second enterprise user device 730, or the like). The action extraction plugin may access the text classification model to facilitate the extraction of times, dates, application names, or the like from messages, task lists, or the like. Furthermore, an action trigger service may be implemented on a cloud computing platform (e.g., cloud computing platform 720). The action extraction plugin may be configured to extract actions from messages and send them to the action trigger service, whereas the action trigger service may be configured to manage all uploaded actions and process the actions in time to trigger an application or web link. Finally, a feedback channel may be implemented for users to provide valuable feedback to improve the text classification model. These and additional aspects will be appreciated with the benefit of the disclosures discussed in further detail below.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting and coupling.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
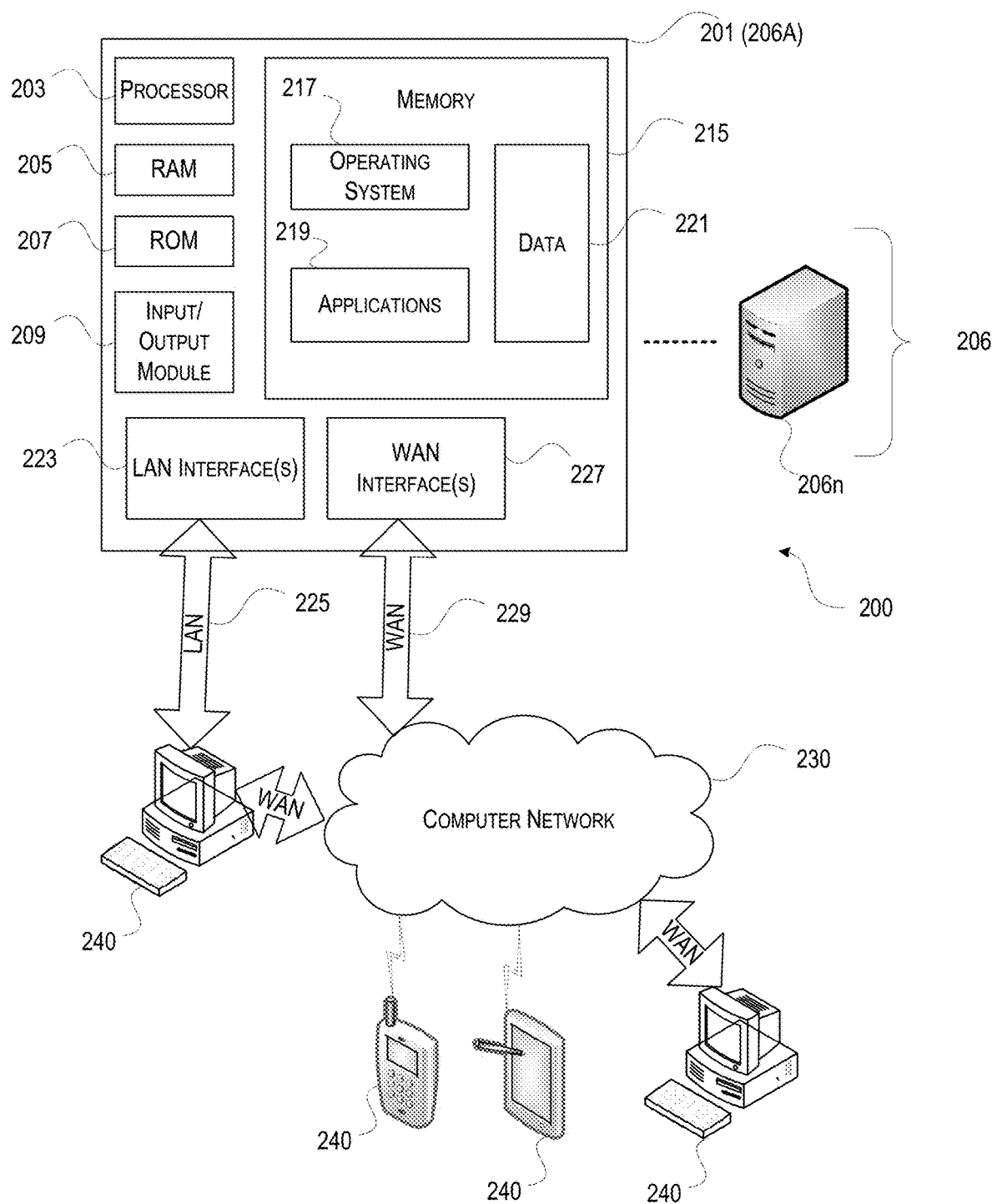
FIG. 2 depicts an illustrative remote-access system architecture that may be used for automated application launching and in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206*a* in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
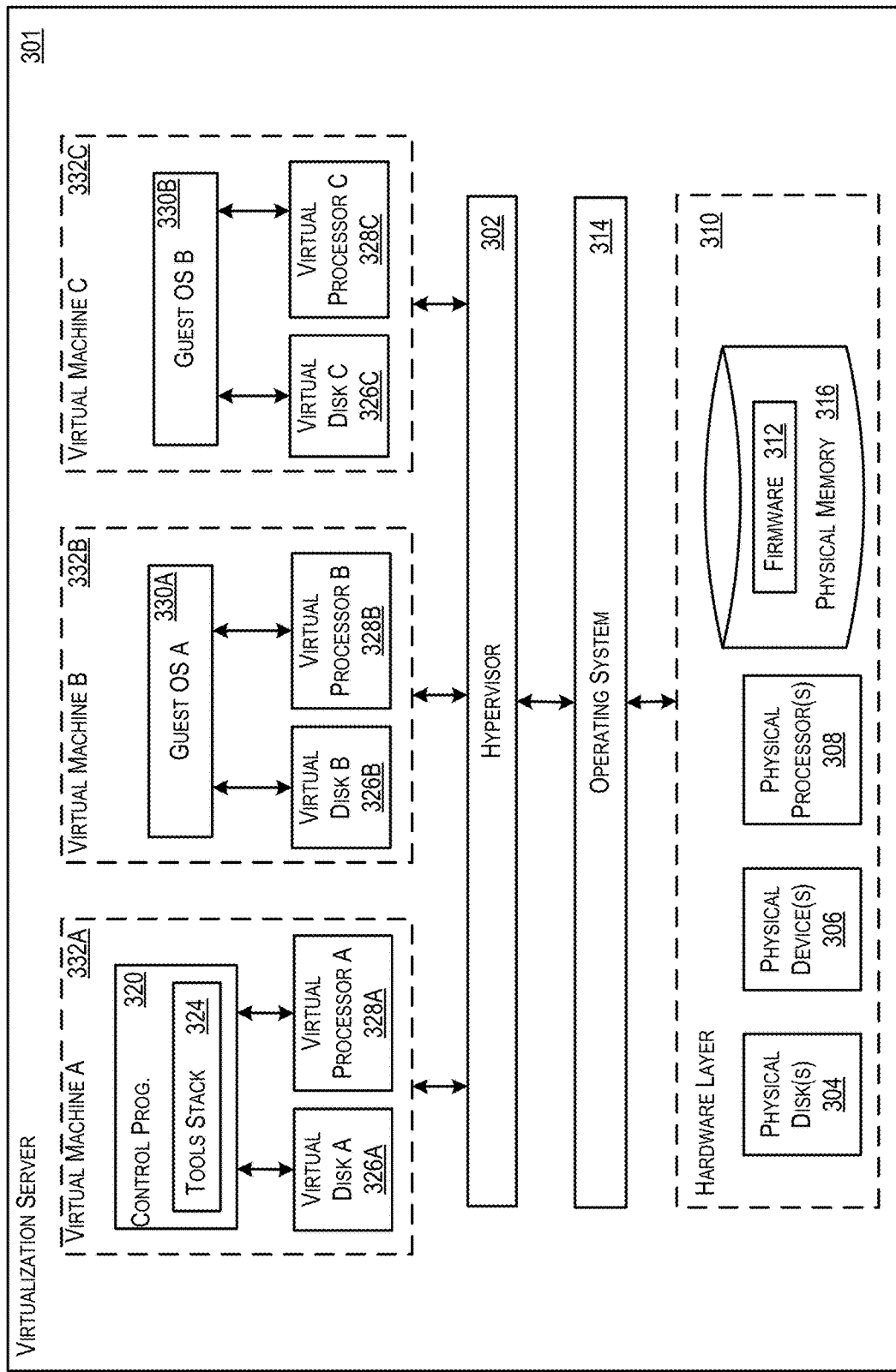
FIG. 3 depicts an illustrative virtualized system architecture that may be used for automated application launching and in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
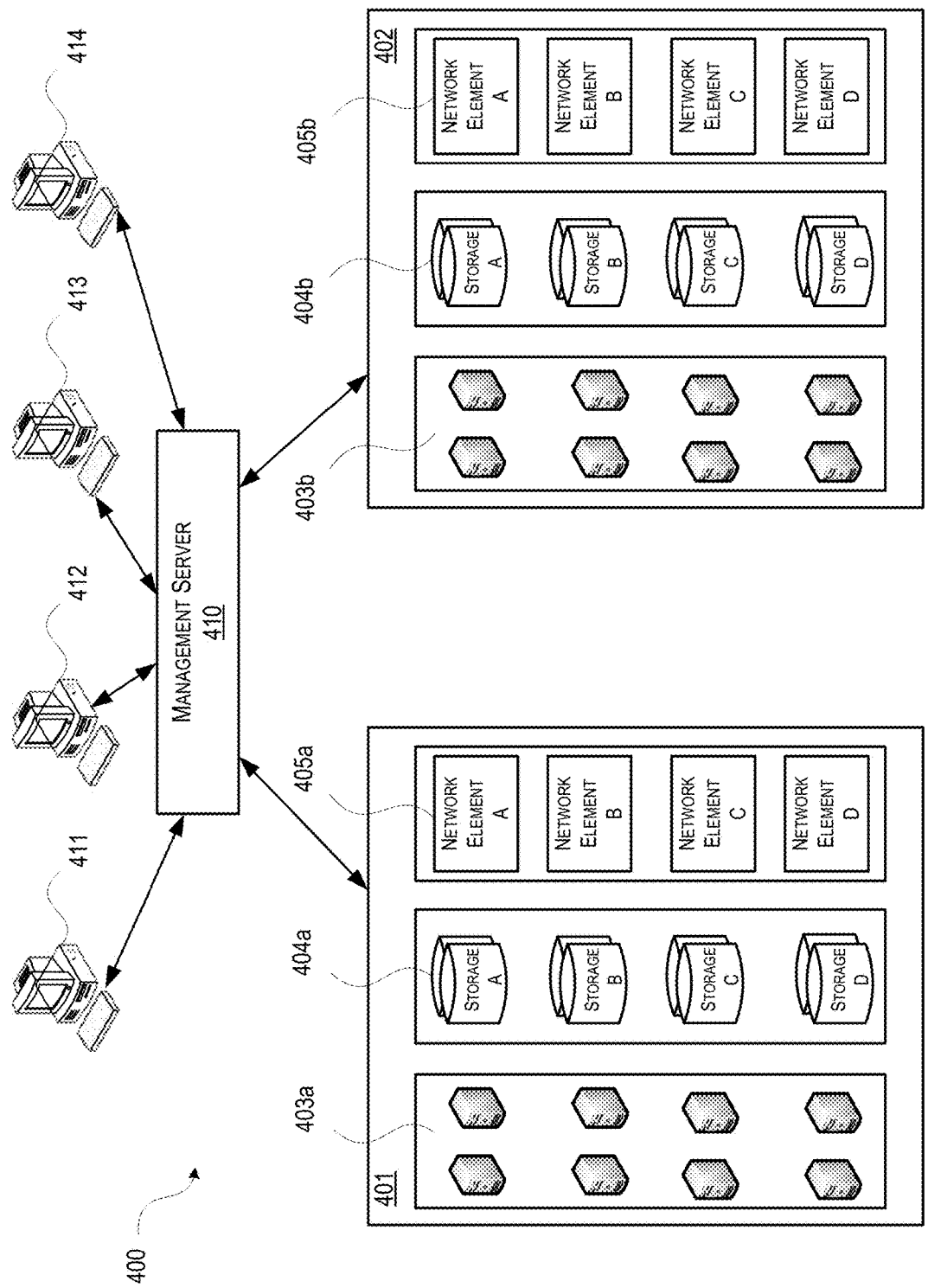
FIG. 4 depicts an illustrative cloud-based system architecture that may be used for automated application launching and in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
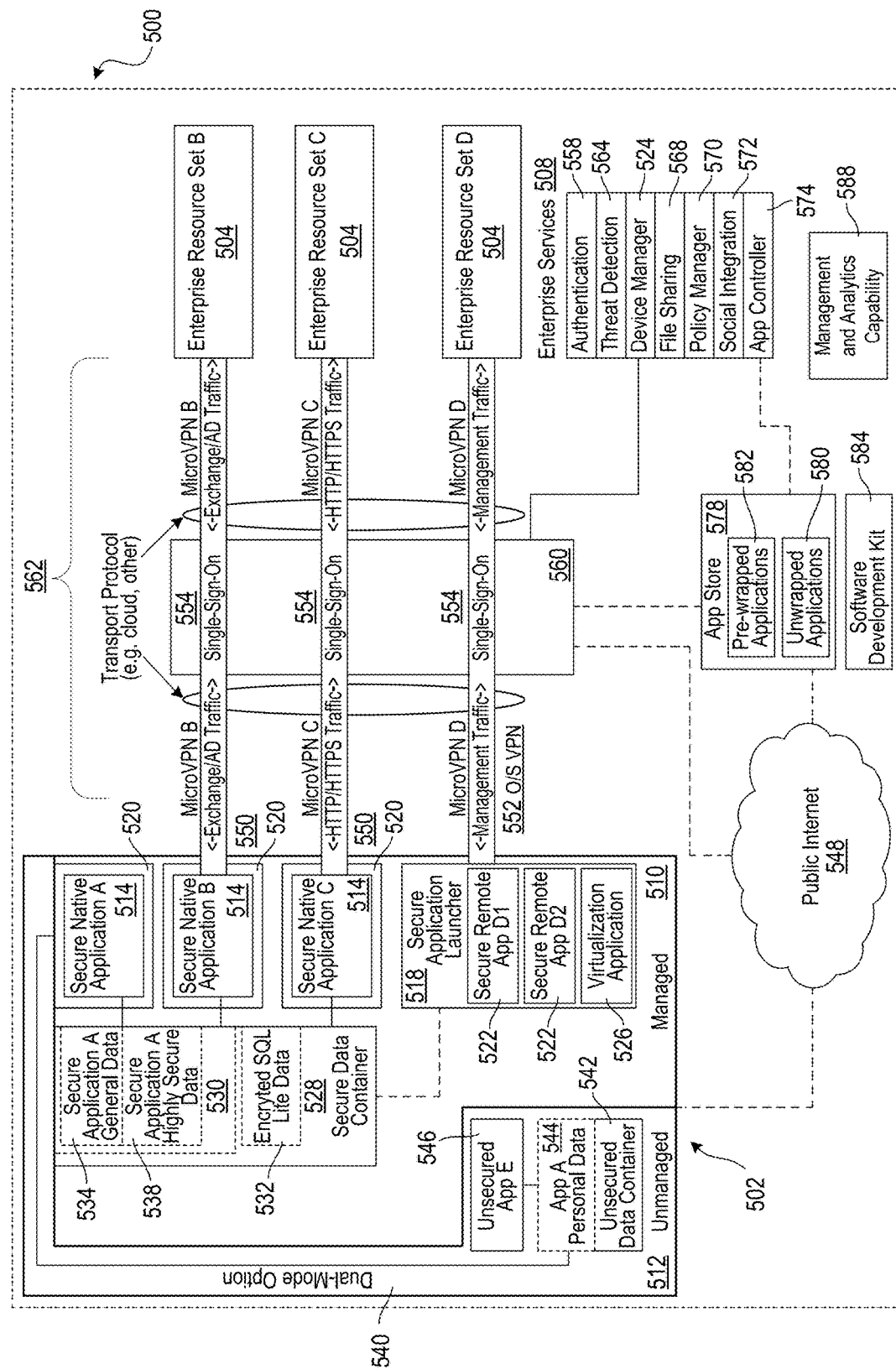
FIG. 5 depicts an illustrative enterprise mobility management system that may be used automated application launching and in accordance with one or more illustrative aspects described herein.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
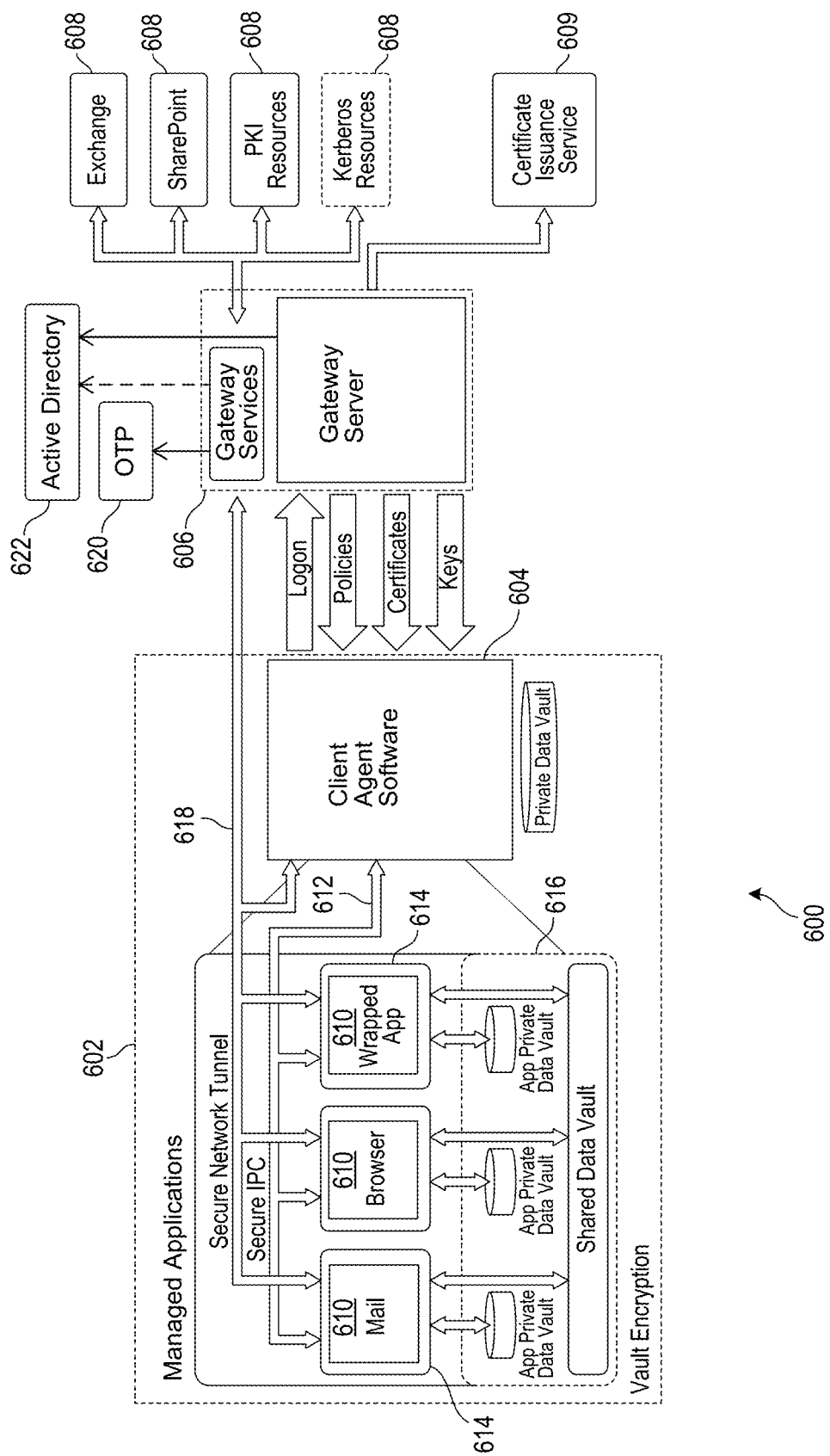
FIG. 6 depicts another illustrative enterprise mobility management system that may be used automated application launching and in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PM) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PM protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PM protected resources.

The client agent 604 and the application management framework 614 may be enhanced to support obtaining and using client certificates for authentication to internal PM protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Systems and Methods for Automated Application Launching

Figure 7A:
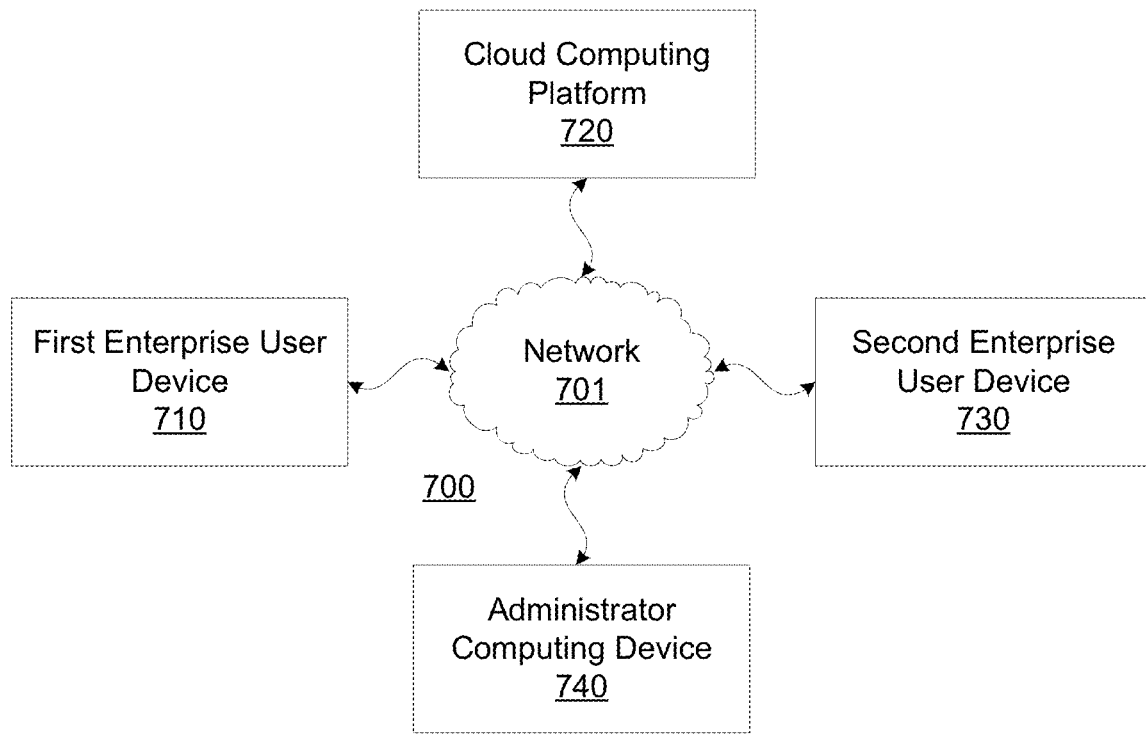
FIGS. 7A and 7B depict an illustrative computing environment for automated application launching in accordance with one or more example embodiments.
Figure 7B:
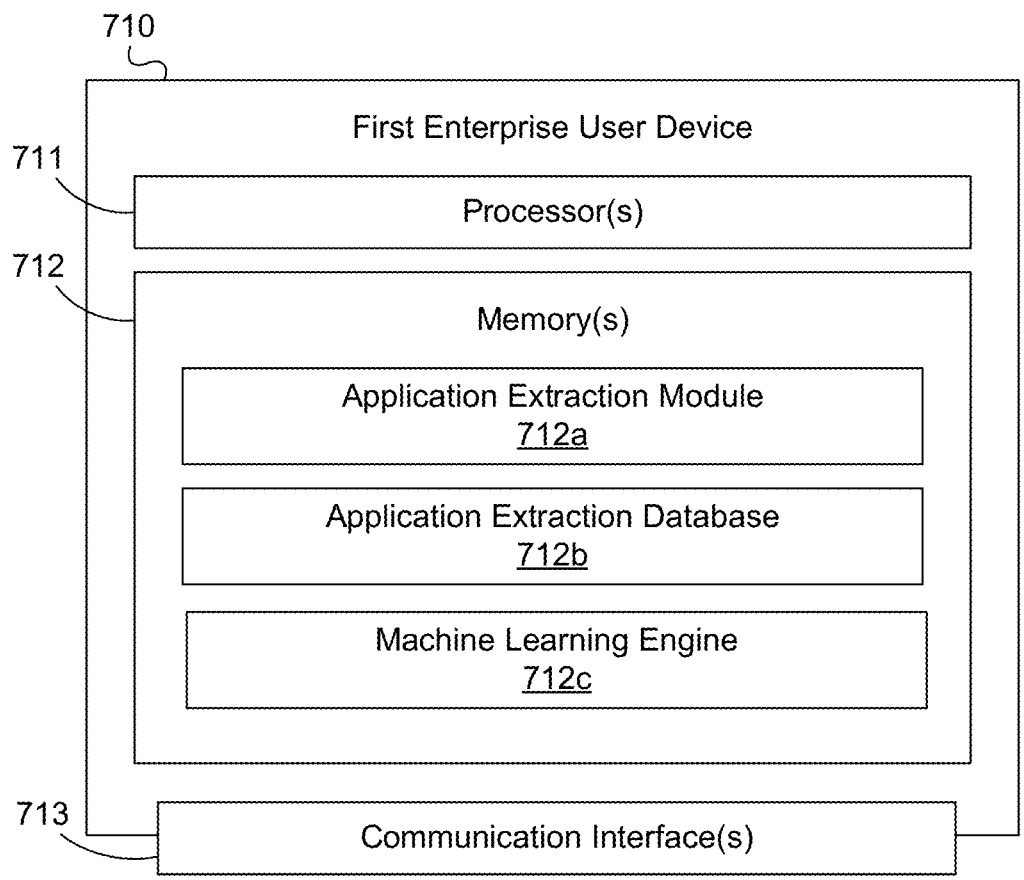

FIGS. 7A and 7B depict an illustrative computing environment for automated application launching in accordance with one or more example embodiments. Referring to FIG. 7A, computing environment 700 may include one or more computer systems. For example, computing environment 700 may include a first enterprise user device 710, and cloud computing platform 720, a second enterprise user device 730, and an administrator computing device 740.

As illustrated in greater detail below, first enterprise user device 710 (which may be, e.g., devices 107 or 109, terminal 240, client computers 411-414, or the like) may include one or more computing devices configured to perform one or more of the functions described herein. For example, first enterprise user device 710 may be a mobile device, a tablet, a smart phone, a laptop computer, a desktop computer, or the like. In some instances, the first enterprise user device 710 may be configured to extract a time and/or application for launch from a message, task list, or the like, and ultimately to launch the extracted application at the extracted time. Additionally, first enterprise user device 710 may be configured to send and/or receive messages from other enterprise user devices (e.g., second enterprise user device 730, or the like). In some instances, the first enterprise user device 710 may be a third party device configured to perform standard computing functions (e.g., send an email containing a virtual meeting link, or the like).

Cloud computing platform 720 (which may, e.g., be device 103 or 105, server 206, management server 410, mobile device 502, mobile device 602, or the like) may be a computer system that includes one or more computing devices and/or other computing components (e.g., processors, memories, communication interfaces, servers, server blades, or the like). In addition, the cloud computing platform 720 may be configured to receive event trigger data, indicating an extracted application and time for launch, from an enterprise user device (e.g., first enterprise user device 710, second enterprise user device 730, or the like) and may store the event trigger data. Further, the cloud computing platform 720 may determine that the time for launch has occurred/will occur within a time window, and may generate/send one or more commands to the enterprise user device (e.g., first enterprise user device 110, second enterprise user device 730, or the like) directing the enterprise user device (e.g., first enterprise user device 110, second enterprise user device 730, or the like) to launch the extracted application at the extracted time for launch.

Second enterprise user device 730 (which may be, e.g., devices 107 or 109, terminal 240, client computers 411-414, mobile device 502, mobile device 602, or the like) may include one or more computing devices configured to perform one or more of the functions described herein. For example, second enterprise user device 730 may be a mobile device, a tablet, a smart phone, a laptop computer, a desktop computer, or the like. In some instances, the second enterprise user device 730 may be configured to extract a time and/or application for launch from a message, task list, or the like, and to perform an action using the application (e.g., launch the extracted application at the extracted time). Additionally, second enterprise user device 730 may be configured to send and/or receive messages from other enterprise user devices (e.g., first enterprise user device 710, or the like). In some instances, the second enterprise user device 730 may be a third party device configured to perform standard computing functions (e.g., send an email containing a virtual meeting link, or the like).

Administrator computing device 740 (which may be, e.g., devices 107 or 109, terminal 240, or the like) may be a computer system that includes one or more computing devices and/or other computer components (e.g., laptop computers, desktop computers, processors, memories, communication interfaces, servers, server blades, or the like). In addition, administrator computing device 740 may be configured to receive and display messages, receive user input (e.g., from an employee of an organization that manages and/or controls the extraction plug-in and/or the trigger service), and cause one or more machine learning datasets, used to extract an application and/or time, to be refined and updated based on the user input.

Computing environment 700 (e.g., network 101, computing network 230, or the like) may also include one or more networks, which may interconnect first enterprise user device 710, cloud computing platform 720, second enterprise user device 730, administrator computing device 740, and/or other devices/systems deployed in the computing environment 700. For example, computing environment 700 may include a network 701 (which may, e.g., interconnect first enterprise user device 710, cloud computing platform 720, second enterprise user device 730, and/or administrator computing device 740).

In one or more arrangements, first enterprise user device 710, cloud computing platform 720, second enterprise user device 730, administrator computing device 740, and/or the other systems included in computing environment 700 may be any type of computing device capable of receiving a user interface, receiving input via the user interface, and communicating the received input to one or more other computing devices. For example, first enterprise user device 710, cloud computing platform 720, second enterprise user device 730, administrator computing device 740, and/or the other systems included in computing environment 700 may in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of first enterprise user device 710, cloud computing platform 720, second enterprise user device 730, and administrator computing device 740 may, in some instances, be special purpose computing devices configured to perform specific functions.

Referring to FIG. 7B, first enterprise user device 710 may include one or more processors 711, memory 712, and communication interface 713. A data bus may interconnect processor 711, memory 712, and communication interface 713. Communication interface 713 may be a network interface configured to support communication between the first enterprise user device 710 and one or more networks (e.g., network 701, or the like). Memory 712 may include one or more program modules having instructions that when executed by processor 711 cause first enterprise user device 710 to perform one or more functions described herein and/or access one or more databases that may store and/or otherwise maintain information which may be used by such program modules and/or processor 711. In some instances, the one or more program modules and/or databases may be stored by and/or maintained in different memory units of first enterprise user device 710. For example, memory 712 may have, host, store, and/or include an application extraction module 712a, an application extraction database 712b, and a machine learning engine 712c. Application extraction module 712a may be configured to cause the first enterprise user device 710 to extract data (e.g., time, application, or the like) and to generate event trigger data that may ultimately cause the first enterprise user device 710 to perform an action (e.g., to automatically launch an application at an extracted time). Application extraction database 712b may be configured to store data and/or instructions that may be used by the application extraction module 712a and/or the first enterprise user device 710 to launch an application. Machine learning engine 712c may be configured to iteratively refine capabilities of the application extraction module 712a and/or the first enterprise user device 710 in performing automated application launching.

Figure 8A:
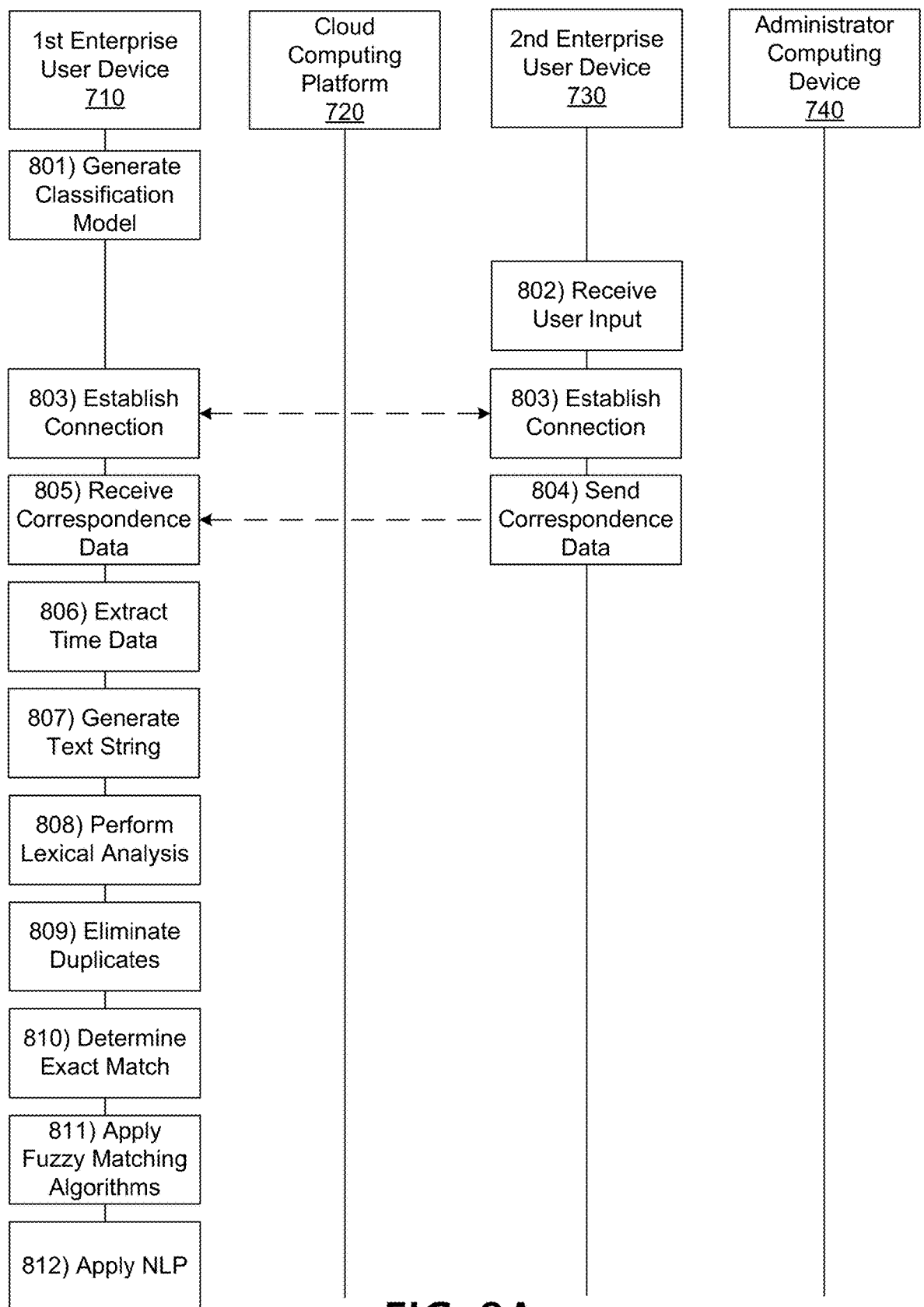
FIGS. 8A-8C depict an illustrative event sequence diagram for automated application launching in accordance with one or more example embodiments.
Figure 8B:
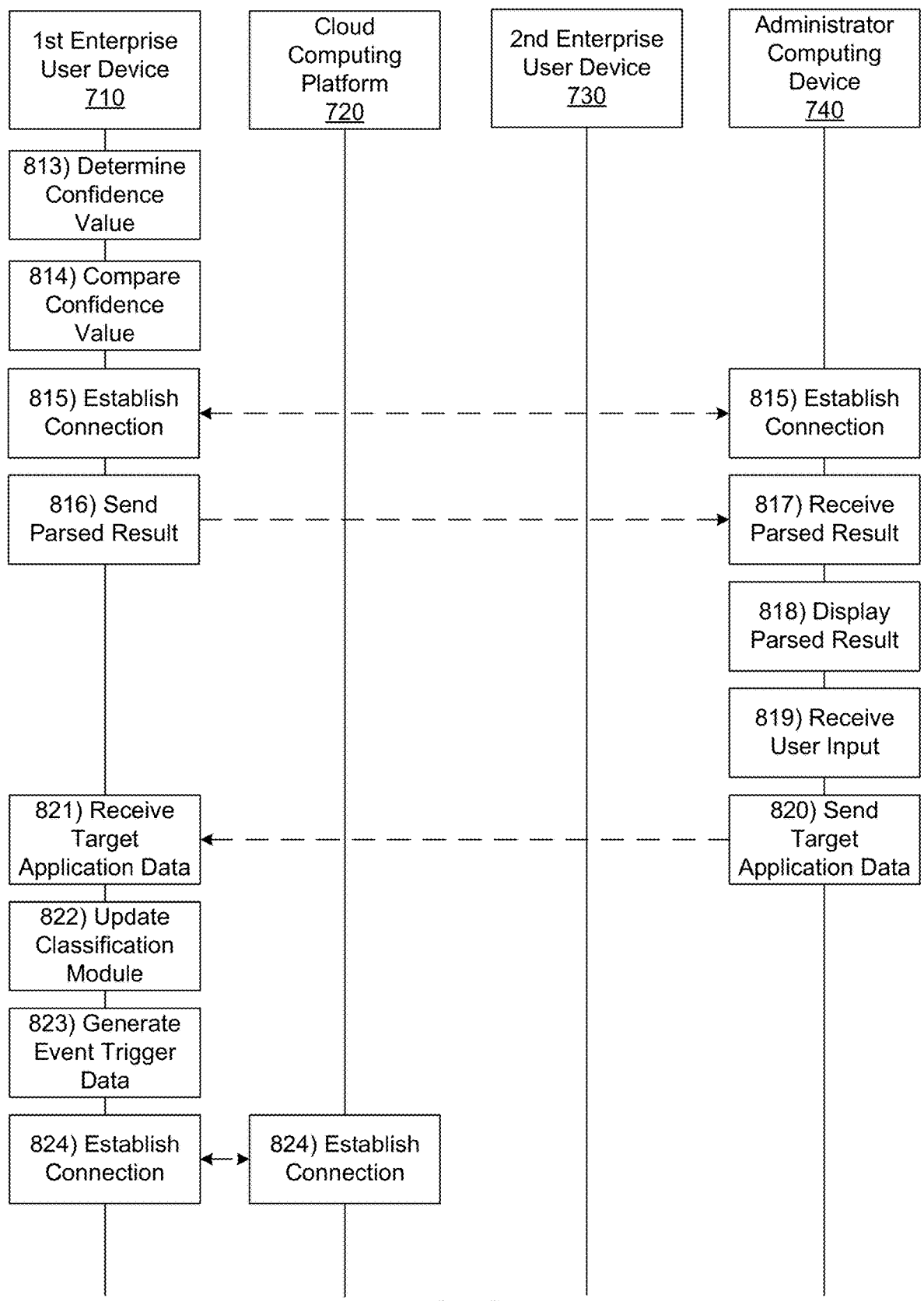
Figure 8C:
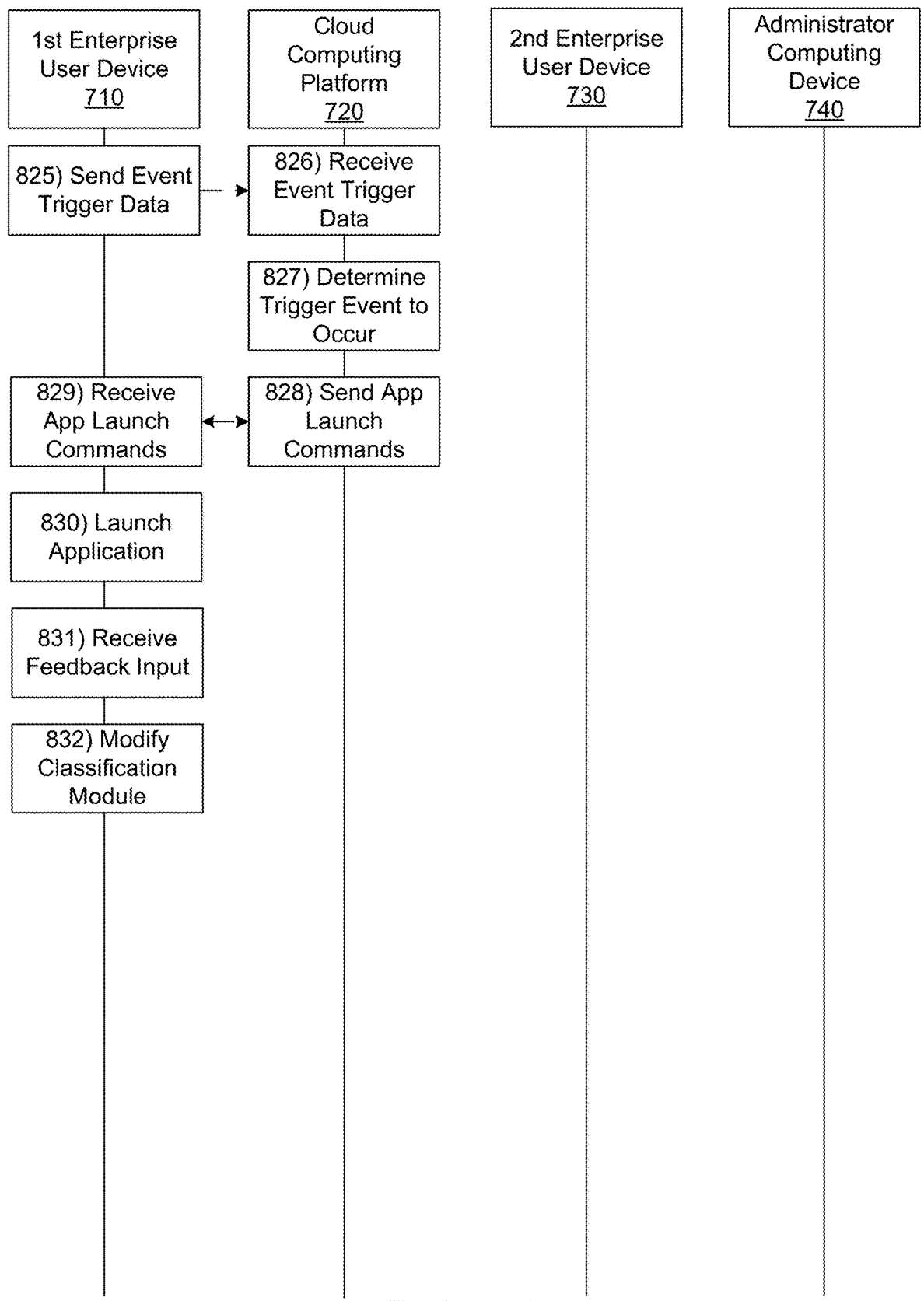

FIGS. 8A-8C depict an illustrative event sequence diagram for automated application launching in accordance with one or more example embodiments. It should be understood that steps 801-832 may occur in the order as shown with regard to FIGS. 8A-8C. For example, after completing step 812 of FIG. 8A, the event sequence diagram may proceed to step 813 of FIG. 8B. Referring to FIG. 8A, at step 801, the first enterprise user device 710 may generate a text classification model (which may e.g., be implemented within the application extraction module 712a). In some instances, the text classification model may be used by the first enterprise user device 120 to extract dates, times, application names, or the like from message data (e.g., by leveraging machine learning datasets and analysis). In one or more instances, in generating the text classification model, the first enterprise user device 710 may compile a plurality of application names and may store the plurality of application names in a database (which may, in some instances, be application extraction database 712b or another database stored in memory 712). In one or more instances, the first enterprise user device 710 may determine the plurality of application names automatically based on a list of applications installed on or otherwise accessible with the first enterprise user device 710. Additionally or alternatively, the first enterprise user device 710 may determine the plurality of application names based on user input received from an administrative user or a user of the first enterprise user device 710.

Additionally or alternatively, in generating the text classification model, the first enterprise user device 710 may implement natural language processing. For example, the first enterprise user device 710 may collect a plurality of text (e.g., a plurality of messages, documents, or the like). In this example, the first enterprise user device 710 may then map the text into numerical vectors. For example, the first enterprise user device 710 may generate a bag-of-words model by representing portions of the text (e.g., a particular phrase, sentence, paragraph, document, or the like) as a "bag" (e.g., a multiset) of its words without regard to grammar or word order. The first enterprise user device 710 may then use machine learning algorithms such as naïve bayes, support vector machines, deep learning, or the like to generate the text classification model, which may store correlations between application names and the text. In some instances, the first enterprise user device 710 may automatically generate the text classification model. Additionally or alternatively, the first enterprise user device 710 may generate the text classification model based at least in part on user input received from either a user of the first enterprise user device 710 or an administrative user (e.g., an employee of an organization that develops and/or maintains the application extraction module 712a).

At step 802, the second enterprise user device 730 may receive a user input, which may e.g., be an input composing a message (e.g., a text, email, or the like) to another individual (e.g., a user of the first enterprise user device 710). As an example, the second enterprise user device 730 may receive user input corresponding to various keyboard keys that have been depressed or otherwise selected in typing and addressing an email to a user of the first enterprise user device 710 (e.g., via a first user account). The user device 730 may also receive user input corresponding to a click of a mouse that selects a "send" button within an email account of the user of the second enterprise user device (e.g., a second user account).

At step 803, the second enterprise user device 730 may establish a connection with the first enterprise user device 710 to enable communication between the second enterprise user device 730 and the first enterprise user device 710. For example, the second enterprise user device 730 may establish a first wireless data connection with the first enterprise user device 710 to link the second enterprise user device 730 to the first enterprise user device 710. In one or more instances, the second enterprise user device 730 may determine whether a connection was previously established with the first enterprise user device 710. If the second enterprise user device 730 determines that a connection was previously established with the first enterprise user device 710, the second enterprise user device 730 might not re-establish the first wireless data connection (e.g., because the connection may already be established between the second enterprise user device 730 and the first enterprise user device 710). Alternatively, if the second enterprise user device 730 determines that a connection was not previously established with the first enterprise user device 710, the second enterprise user device 730 may establish the first wireless data connection as described herein.

At step 804, the second enterprise user device 730 may send correspondence data to the first enterprise user device 110 to communicate information to the first enterprise user device 110 (e.g., details for a meeting, or the like). For example, in some instances, the correspondence data may be one of an email message, a calendar invitation, a text message, a multimedia message, an instant message (e.g., via an instant messaging application), an electronic task alert, an email attachment, or the like. In one or more instances, the second enterprise user device 730 may send correspondence data to the first enterprise user device 110 while the first wireless data connection is still established. In one or more instances, in sending correspondence data to the first enterprise user device 110, the second enterprise user device 730 may send one of an email message, a calendar invitation, a text message, a multimedia message, an instant message (e.g., via an instant messaging application), an electronic task alert, an email attachment, or the like.

Figure 10:
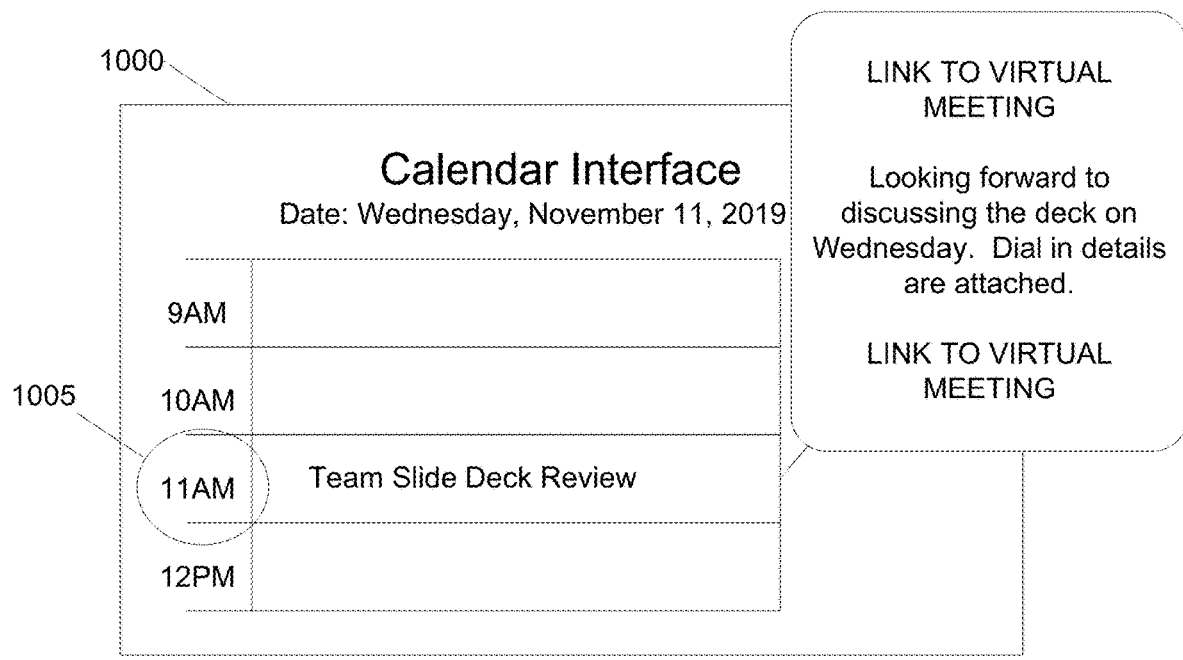
FIGS. 10-14 depict illustrative graphical user interfaces for automated application launching in accordance with one or more example embodiments.

At step 805, the first enterprise user device 710 may receive correspondence data sent at step 804. In one or more instances, the second enterprise user device 730 may receive correspondence data via the communication interface 113 and while the first wireless data connection is established. As a particular example, the first enterprise user device 710 may receive a calendar invitation to attend a meeting from e.g., the second enterprise user device 730. Accordingly, the first enterprise user device 710 may generate and display a user interface similar to graphical user interface 1000, which is illustrated in FIG. 10. It should be understood that the text callout in FIG. 10 might not be displayed on graphical user interface 1000, but rather illustrates the contents of the received meeting invite as they would be displayed to a user of the first enterprise user device 710 when initially received. For example, the first enterprise user device 710 may receive a calendar invitation that reads "Looking forward to discussing the deck on Wednesday. Dial in details are attached." In this example, the first enterprise user device 710 may add an appointment to a calendar (e.g., within an email application running on the first enterprise user device 710), and may display the calendar via a display of the first enterprise user device 710.

Figure 12:

Alternatively, rather than receiving correspondence data from the second enterprise user device 730, the first enterprise user device 710 may receive correspondence data via a user interface of the first enterprise user device 710 (e.g., from a user of the first enterprise user device 710). For example, a user of the first enterprise user device 710 may provide an input to generate a personal schedule, task list, to do list, or the like, which might not require that correspondence data be received from another enterprise user device (e.g., second enterprise user device 730). In this example, the first enterprise user device 710 may generate and display a graphical user interface similar to graphical user interface 1200, which is illustrated in FIG. 12. For example, the first enterprise user device 710 may add a task to a stored calendar that may be linked to the user's task list (e.g., "Perform task A from 9 AM-10 AM, Perform task B from 10 AM-11 AM," or the like), and may display the stored task list calendar (along with the newly added task).

At step 806, the first enterprise user device 710 may extract target data such as time field information from correspondence data. For example, the first enterprise user device 710 may have one or more time field formats stored (e.g., in the application extraction database 712*b*). For example, the first enterprise user device 710 may be configured to determine that numbers in the following formats, among others, represent a date and/or a time: "HH:mm:ss," "hh:mm," "yymmdd," "today/tomorrow," or the like. In one or more instances, the first enterprise user device 710 may dynamically update a list of time field formats based on feedback ultimately received from a user (e.g., correspondence data included time field information that the first enterprise user device 710 failed to recognize) and/or based on user input (e.g., a user may manually update a stored list of time field formats).

Accordingly, the first enterprise user device 710 may analyze correspondence data, received at step 805, to determine whether correspondence data includes numbers in one of the above mentioned time field formats. If so, the first enterprise user device 710 may extract the time field information. For example, assuming that the first enterprise user device 710 received the calendar invitation shown on graphical user interface 1000 as correspondence data at step 805, the first enterprise user device 710 may determine that the calendar invite includes a time field indicating "Wednesday, Nov. 6, 2019 10:00 AM-11:00 AM." Accordingly, the first enterprise user device 710 may extract the time field information (e.g., such as time field information 1005, which is shown in FIG. 10) corresponding to the start of the meeting (e.g., 11:00 AM). Alternatively, if the first enterprise user device 710 is unable to determine whether correspondence data includes numbers in one of the above mentioned time field formats and/or determines that correspondence data affirmatively does not include numbers in one of the above mentioned time field formats, the first enterprise user device 710 may proceed to step 807 without extracting time field information.

At step 807, the first enterprise user device 710 may initiate extraction of additional target data (e.g., application name) to determine one or more applications that may be associated with correspondence data (e.g., a virtual meeting application, a word processing application, a slide deck application, a spreadsheet application, or the like). As a first step in extracting an application name from correspondence data, the first enterprise user device 710 may generate a text string by combining the subject and content of correspondence data. For example, with regard to the calendar invite illustrated in FIG. 10, the first enterprise user device 710 may generate a text string such as "Team Slide Deck Review Looking forward to discussing the deck on Wednesday. Dial in details are attached." In one or more instances, the first enterprise user device 710 may determine that correspondence data also includes a link (e.g., to a virtual meeting room), and may add the link to the text string described above (e.g., "Team Slide Deck Review LINK TO VIRTUAL MEETING Looking forward to discussing the deck on Wednesday. Dial in details are attached. LINK TO VIRTUAL MEETING"). In one or more instances, in generating the text string, the first enterprise user device 710 may also analyze one or more attachment names, and may add the one or more attachment names to the text string.

At step 808, after generating the text string at step 807, the first enterprise user device 710 may perform lexical analysis on the text string to separate the text string into one or more phrases. For example, with regard to the example discussed at step 807 and illustrated in FIG. 10, the first enterprise user device 710 may determine that the text string includes the following phrases: 1) "Team Slide Deck Review," 2) "LINK TO VIRTUAL MEETING," 3) "Looking forward to discussing the deck on Wednesday," 4) "Dial in details are attached," and 5) "LINK TO VIRTUAL MEETING."

At step 809, after separating the text string into the one or more phrases at step 808, the first enterprise user device 710 may remove duplicates from the one or more phrases. Accordingly, to further illustrate the example discussed above at steps 807 and 808 and illustrated in FIG. 10, the first enterprise user device 710 may determine that phrases two and five are the same, and may filter the phrases to remove one of the instances of "LINK TO VIRTUAL MEETING." Accordingly, the result of the application extraction process at step 209 may be 1) "Team Slide Deck Review," 2) "LINK TO VIRTUAL MEETING," 3) "Looking forward to discussing the deck on Wednesday," and 4) "Dial in details are attached," (the same as the output of step 808, with the exception of the removal of phrase five, "LINK TO VIRTUAL MEETING"). Accordingly, steps 207-209 may result in a parsed result representative of correspondence data.

At step 810, the first enterprise user device 710 may begin analyzing the parsed result to extract an application name based on one or more rules (e.g., that may be stored in the application extraction database 712*b*). In one or more instances, the first enterprise user device 710 may determine that a most efficient method of determining the application name may be to compare the parsed result against a list of applications (e.g., the plurality of application names described above at step 801) and determine whether the first enterprise user device 710 can determine a match (e.g., an exact match or a partial match). For example, the first enterprise user device 710 may determine whether the parsed result contains an application name such as the name of a spreadsheet application, a slideshow application, a word processing application, a virtual meeting application, or the like. To do so, in one or more instances, the first enterprise user device 710 may perform a lookup function using the list of applications to determine whether the p list of applications includes any portion of the parsed result. In some instances, the first enterprise user device 710 may determine that the list of applications contains an entire phrase of the parsed result. In other instances, the first enterprise user device 710 may determine that the list of applications contains a single word from the parsed result. In either case, if the first enterprise user device 710 determines a match, the first enterprise user device 710 may proceed to step 813. Alternatively, if the first enterprise user device 710 does not determine a match, the first enterprise user device 710 may proceed to step 811. In extracting the application name, the first enterprise user device 710 may determine the target application based on the application name.

For example, to further describe the use case involving the parsed result determined at step 809, the first enterprise user device 710 may compare the parsed result from step 809 to the list of applications, which may include, for example, First Word Processing Application, Second Word Processing Application, First Virtual Meeting Application, and First Slideshow Application. In comparing the parsed result from step 809, the first enterprise user device 710 might not determine an exact match between the parsed result and the list of applications (e.g., because the parsed result does not include an application name) Accordingly, the first enterprise user device 710 may proceed to step 811.

At step 811, after determining that the parsed result did not exactly match the application list, the first enterprise user device 710 may apply one or more fuzzy matching techniques in an attempt to determine an application name. For example, in applying the fuzzy matching techniques, the first enterprise user device 710 may define a fuzzy matching threshold (e.g., a percentage) corresponding to an acceptable matching level between the list of applications and the parsed result. In one or more instances, the first enterprise user device 710 may determine the fuzzy matching threshold based on user input received. Additionally or alternatively, the first enterprise user device 710 may automatically determine the fuzzy matching threshold using one or more machine learning approaches to determine a threshold that optimizes the balance between accuracy and match determinations. For example, the first enterprise user device 710 may define the fuzzy matching threshold as 80%. In this example, if the first enterprise user device 710 is able to determine a match with 80% certainty (e.g., by applying the text classification model generated at step 801 to the parsed result), the first enterprise user device 710 may determine that the parsed result contains a particular application name although there might not be an exact match. For example, to further describe the use case involving the parsed result determined at step 809, although the parsed result does not contain the application name "First Virtual Meeting Application," the first enterprise user device 710 may determine that a correlation between "First Virtual Meeting Application" and "LINK TO VIRTUAL MEETING" may exceed the fuzzy matching threshold. In this example, the first enterprise user device 710 may determine a match, and may proceed to step 813. Accordingly, the first enterprise user device may be able to identify applications that might not have been identified if merely exact matching had been employed. In extracting the application name, the first enterprise user device 710 may determine the target application based on the application name.

Alternatively, in an example where the first enterprise user device 710 is unable to determine a correlation that exceeds the fuzzy matching threshold, the first enterprise user device 710 may proceed to step 812. For example, the first enterprise user device 710 may determine that a correlation between "deck" and "First Slideshow Application" does not exceed the fuzzy matching threshold, and thus might not determine a match with regard to this application Additionally or alternatively, rather than performing the methods described at step 811 only after determining that the parsed result did not contain any exact matches at step 810, the first enterprise user device 710 may determine one or more exact matches at step 810, but may nevertheless perform the methods described at step 811 to uncover additional matches (e.g., in some instances, multiple applications should be launched for particular correspondence data).

At step 812, after determining that the parsed result did not contain any matches with the application list that exceed the fuzzy matching threshold, the first enterprise user device 710 may analyze the parsed result using natural language processing based on the text classification model generated at step 801. For example, in applying natural language processing, the first enterprise user device 710 may determine intent, context, or the like included in the parsed result. For example, although the first enterprise user device 710 determined, at step 811, that the correlation between "deck" and "First Slideshow Application" did not exceed the fuzzy matching threshold, based on natural language processing, the first enterprise user device 710 may be able to determine that the parsed result is referring to the First Slideshow Application, and thus may determine a match that might not have been uncovered if merely exact matching and fuzzy matching were employed. In one or more instances, in applying the natural language processing, the first enterprise user device 710 may extract the application name, and may determine the target application based on the application name.

Additionally or alternatively, rather than performing the methods described at step 812 only after determining that the parsed result did not contain any fuzzy matches at step 811, the first enterprise user device 710 may determine one or more fuzzy matches at step 811, but may nevertheless perform the methods described at step 812 to uncover additional matches (e.g., in some instances, multiple applications should be launched for particular correspondence data).

If, after applying natural language processing, the first enterprise user device 710 is still unable to identify a match, the event sequence may end. Alternatively, the first enterprise user device 710 may forward the parsed result for further analysis and/or manual review (e.g., by the user of the first enterprise user device 710, an administrator, or the like). Accordingly, this may result in identification of missed matches (e.g., false negatives) and may ultimately improve the machine learning processes used to determine the match.

Referring to FIG. 8B, at step 813, the first enterprise user device 710 may determine a confidence value corresponding to the determined match. For example, the first enterprise user device 710 may determine a value between one and ten indicating a confidence that each identified application (e.g., First Virtual Meeting Application and First Slideshow Application) was accurately identified. In some instances, applications identified through exact matching may be assigned higher confidence values than those identified with fuzzy matching and/or natural language processing. In these instances, applications identified through fuzzy matching may be assigned higher confidence values than those identified through natural language processing. For example, in the use case described above, the first enterprise user device 710 may associate the First Virtual Meeting Application with a confidence level of 8 and the First Slideshow Application with a confidence level of 6.

At step 814, the first enterprise user device 710 may compare the confidence values determined at step 813 to a confidence threshold. In one or more instances, the first enterprise user device 710 may automatically determine the confidence threshold (e.g., to balance optimization of accuracy and quantity of identified matches) using one or more machine learning techniques. Additionally or alternatively, the first enterprise user device 710 may determine the confidence threshold based on user input. For example, the first enterprise user device 710 may determine a confidence threshold of five. The first enterprise user device 710 may then compare the confidence values determined at step 813 to the confidence threshold determined at step 814. In some instances, the first enterprise user device 710 may determine one or more confidence values that exceed the confidence threshold (e.g., First Virtual Meeting Application=8 and First Slideshow Application=6, so both exceed). In these instances, the first enterprise user device 710 may proceed to step 823. Additionally or alternatively, the first enterprise user device 710 may determine one or more confidence values that do not exceed the confidence threshold. In these instances, the first enterprise user device 710 may proceed to step 815.

At step 815, the first enterprise user device 710 may establish a connection with the administrator computing device 740. In one or more instances, the first enterprise user device 710 may establish a second wireless data connection with the administrator computing device 740 to link the first enterprise user device 710 to the administrator computing device 740. In one or more instances, the first enterprise user device 710 may determine whether a connection was previously established with the administrator computing device 740. If the first enterprise user device 710 determines that a connection was previously established with the administrator computing device 740, the first enterprise user device 710 might not re-establish the second wireless data connection (e.g., because a connection may already be established between the first enterprise user device 710 and the administrator computing device 740). However, if the first enterprise user device 710 determines that a connection was not previously established with the administrator computing device 740, the first enterprise user device 710 may establish the second wireless data connection as described herein.

At step 816, the first enterprise user device 710 may send the parsed result, determined at step 809, to the administrator computing device 740. In one or more instances, the first enterprise user device 710 may send the parsed result to the administrator computing device 740 via the communication interface 713 and while the second wireless data connection is established.

At step 817, the administrator computing device 740 may receive the parsed result sent at step 816. In one or more instances, the administrator computing device 740 may receive the parsed result while the second wireless data connection is established.

Figure 14:
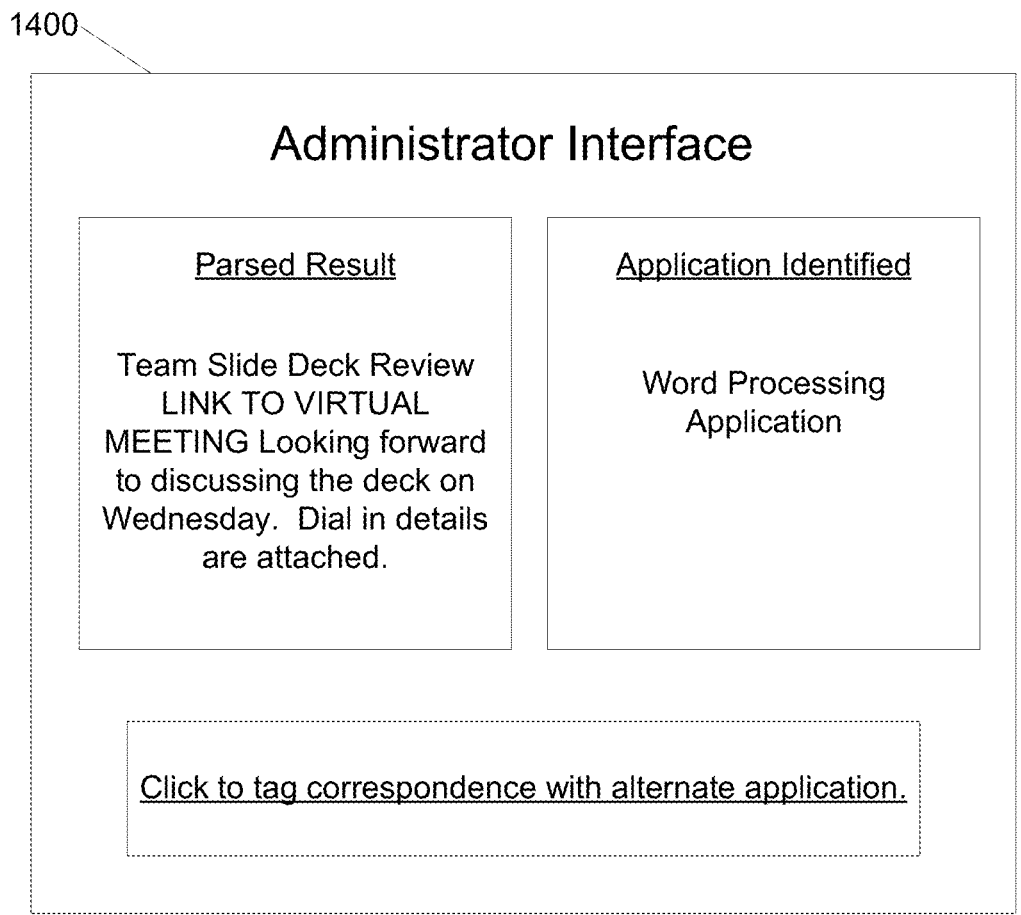

At step 818, the administrator computing device 740 may display the parsed result. In one or more instances, in displaying the parsed result, the administrator computing device 740 may generate and display a graphical user interface similar to graphical user interface 1400, which is shown in FIG. 14. For example, the administrator computing device 740 may display the parsed result alongside of an application identified at one of steps 810-812, and that was associated with a confidence value less than the confidence threshold. For example, the first enterprise user device 710 may have somehow reached the conclusion that the parsed result corresponded to a word processing application, and subsequently flagged this with a low confidence value.

At step 819, the administrator computing device 740 may receive a user input associated with the interface displayed at step 818. For example, an administrator (e.g., an employee of an organization that controls the cloud computing platform 720 and/or maintains the application extraction module 712a) may manually determine whether a correct application was identified, and may provide a user input to either indicate that the correct application was extracted or to tag the parsed result with an alternate application. In the example illustrated in FIG. 14, an administrator may indicate that a virtual meeting application and/or a slideshow application should be identified and that a word processing application should not be identified.

At step 820, the administrator computing device 740 may send target application data, indicating applications identified and/or verified at step 819 by the user input, to the first enterprise user device 710. In one or more instances, the administrator computing device 740 may send the target application data while the second wireless data connection is established.

At step 821, the first enterprise user device 710 may receive the target application data sent at step 820. In one or more instances, the first enterprise user device 710 may receive the target application data via the communication interface 113 and while the second wireless data connection is established.

At step 822, the first enterprise user device 710 may update the text classification model based on the target application data received at step 821. For example, if the first enterprise user device 710 received feedback indicating that one or more applications extracted by the first enterprise user device 710 at steps 810-812 were erroneously extracted, the first enterprise user device 710 may update one or more machine learning datasets that were relied upon to make the erroneous extractions. Accordingly, the first enterprise user device 710 may continuously and dynamically improve its accuracy when extracting application names from correspondence data. Similarly, if the first enterprise user device 710 received feedback indicating that one or more applications were accurately extracted by the first enterprise user device 710 at steps 810-812, but were assigned low confidence values at step 813, the first enterprise user device 710 may update one or more machine learning datasets that were relied on to make the confidence value assignment. Accordingly, the first enterprise user device 710 may continuously and dynamically improve its accuracy, and may reduce processing load on the administrator computing device 740 and the manual processing load on the administrator operating the administrator computing device 740 by reducing a count of false positives sent to the administrator computing device 740.

At step 823, the first enterprise user device 710 may generate event trigger data. For example, based on the time field information extracted at step 806, the application data determined at steps 810-812, and/or the application data received at step 821, the first enterprise user device 710 may generate event trigger data indicating an application (e.g., the extracted application) that should be launched at a particular time (e.g., the extracted time). For example, with regard to the use case illustrated in FIG. 10, the first enterprise user device 710 may generate event trigger data indicating that Slideshow Application #1 and Virtual Meeting Application #1 should be launched at 11 AM on Wednesday, Nov. 11, 2019.

At step 824, the first enterprise user device 710 may establish a connection with the cloud computing platform 720. In one or more instances, the first enterprise user device 710 may establish a third wireless data connection with the cloud computing platform 720 to link the first enterprise user device 710 to the cloud computing platform 720. In one or more instances, the first enterprise user device 710 may determine whether a connection was previously established with the cloud computing platform 720. If the first enterprise user device 710 determines that a connection was previously established with the cloud computing platform 720, the first enterprise user device 710 might not re-establish the third wireless data connection (e.g., because a connection already may be established between the first enterprise user device 710 and the cloud computing platform 720). However, if the first enterprise user device 710 determines that a connection was not previously established with the cloud computing platform 720, the first enterprise user device 710 may establish the third wireless data connection as described herein.

Referring to FIG. 8C, at step 825, the first enterprise user device 710 may send event trigger data to the cloud computing platform 720. In one or more instances, the first enterprise user device 710 may send event trigger data to the cloud computing platform 720 via the communication interface and while the third wireless data connection is established.

At step 826, the cloud computing platform 720 may receive event trigger data from the first enterprise user device 710. In one or more instances, the cloud computing platform 720 may receive event trigger data from the first enterprise user device 710 while the third wireless data connection is established. In receiving event trigger data from the first enterprise user device 710, the cloud computing platform 720 may store data indicating the extracted application for launch and data indicating the time at which to launch the extracted application. In one or more instances, the cloud computing platform 720 may maintain a trigger service module, and may store the data indicating the extracted application for launch and the data indicating the time at which to launch the extracted application. In one or more instances an action, to be taken once the time at which to launch the extracted application occurs, may be defined by a user (e.g., a user of the first enterprise user device 710 and/or an administrator). For example, the cloud computing platform 720 may store data indicating that a reminder message should be sent to the user reminding them to launch the extracted application. Additionally or alternatively, the cloud computing platform 720 may store data indicating that the extracted application should be launched on the first enterprise user device 710 at a time before the time indicated in the extracted time field information. In doing so, the first enterprise user device 710 may provide a user with an opportunity to review materials prior to a discussion, eliminate wait time for meeting participants while applications are launched, or the like. In one or more instances, the application name, the launch time, and the action may be stored by the cloud computing platform 720 in a service configuration file, which may be maintained by the cloud computing platform 720. For example, the cloud computing platform 720 may store data indicating that Slideshow Application #1 and Virtual Meeting Application #1 should be launched at 11 AM on Wednesday, Nov. 11, 2019.

At step 827, the cloud computing platform 720 may determine that the time (e.g., the extracted time, a predetermined amount of time before the extracted time, or the like) at which to perform an action (e.g., launch an application, render a to do list, or the like) has arrived. For example, the cloud computing platform 720 may maintain a list of time ques, and individual time ques may be activated once the corresponding point in time is reached. For example, the cloud computing platform 720 may determine is the time to be 11 AM on Wednesday, Nov. 11, 2019 (or some predetermined period of time prior to 11 AM e.g., 15 minutes earlier), and accordingly may determine that Slideshow Application #1 and Virtual Meeting Application #1 should be launched.

At step 828, once the cloud computing platform 720 determines that the launch time has arrived, the cloud computing platform 720 may generate one or more commands directing the first enterprise user device 710 to launch the extracted application. In one or more instances, the cloud computing platform 720 may send the one or more commands directing the first enterprise user device 710 to launch the extracted application while the third wireless data connection is established.

At step 829, the first enterprise user device 710 may receive the one or more commands directing the first enterprise user device 710 to launch the extracted application. In one or more instances, the cloud computing platform 720 may receive the one or more commands directing the first enterprise user device 710 to launch the extracted application via the communication interface 113 and while the third wireless data connection is established.

Figure 11:
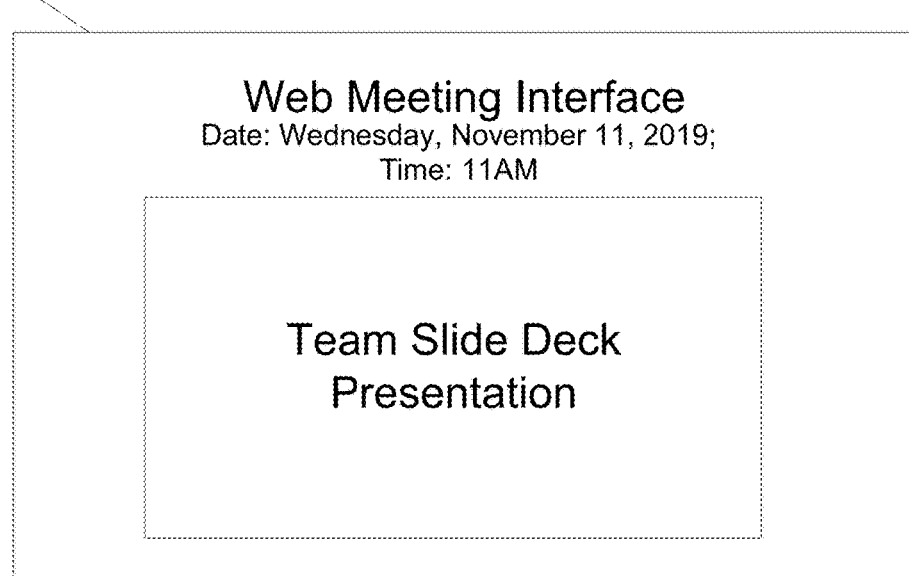

At step 830, the first enterprise user device 710 may launch the extracted application in response to the one or more commands directing the first enterprise user device 710 to launch the extracted application, received at step 829. For example, the first enterprise user device 710 may generate a graphical user interface similar to graphical user interface 1100, which is illustrated in FIG. 11. For example, FIG. 11 continues to illustrate the use case described in FIG. 10. In this example, the first enterprise user device 710 may automatically launch Virtual Meeting Application #1 and Slideshow Application #1 (for display at 11 AM on Wednesday, Nov. 11, 2019) in accordance with the meeting details and applications described in the calendar invitation received and displayed in graphical user interface 1000.

Figure 13:
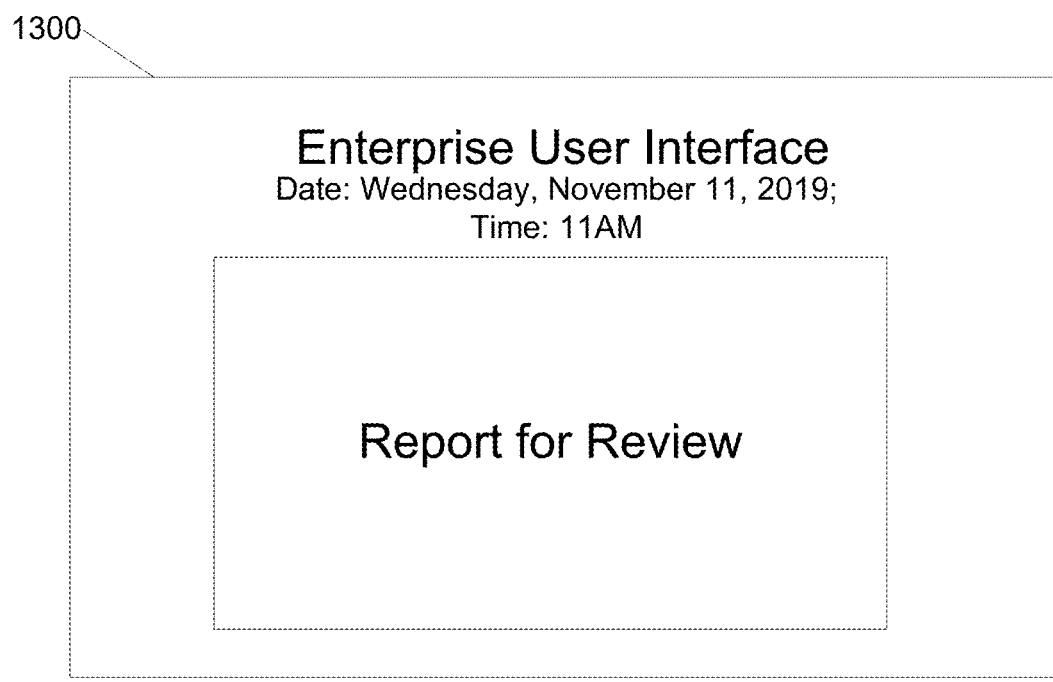

Similarly, in launching the extracted application, the first enterprise user device 710 may generate a graphical user interface similar to graphical user interface 1300, which is illustrated in FIG. 13. For example, FIG. 13 continues to illustrate the use case described in FIG. 12 In this example, the first enterprise user device 710 may automatically launch Word Processing Application #1 at 11 AM on Wednesday, Nov. 11, 2019 in accordance with the details of the task list shown in graphical user interface 1200.

It should be understood that in some instances, rather than merely launching the extracted application, the first enterprise user device 710 may launch a specific file (e.g., the slideshow described in FIGS. 10-11 and the report described in FIGS. 12-13).

At step 831, the first enterprise user device 710 may receive feedback input from a user of the first enterprise user device 710. For example, the first enterprise user device 710 may receive user input indicating whether or not the correct application was launched, whether the timing was accurate, or the like.

At step 832, the first enterprise user device 710 may update one or more machine learning datasets used to extract the application and time (which may e.g., be part of the text classification model generated at step 801). In doing so, the first enterprise user device 710 may continually increase its accuracy in analyzing correspondence data and will dynamically improve its event trigger generation in real time.

It should be understood that in addition to or as an alternative to implementing the event sequence described in steps 801-832 on enterprise user devices (e.g., first enterprise user device 710, second enterprise user device 720, or the like), the event sequence may be implemented at one or more virtual machines (e.g., virtual machine 322A, virtual machine 322B, virtual machine 322C, or the like), which may, in some instances, be accessed by the first enterprise user device 710, the second enterprise user device 720, or the like. In some instances, the steps 801-832 may be implemented in a local area network, a virtualization platform (e.g., as shown in FIG. 3), a cloud computing service (e.g., as shown in FIG. 4), a BYOD environment (e.g., as shown in FIG. 5), an enterprise mobility management system (e.g., as shown in FIG. 6), or the like without departing from the scope of the present disclosure.

Figure 9:
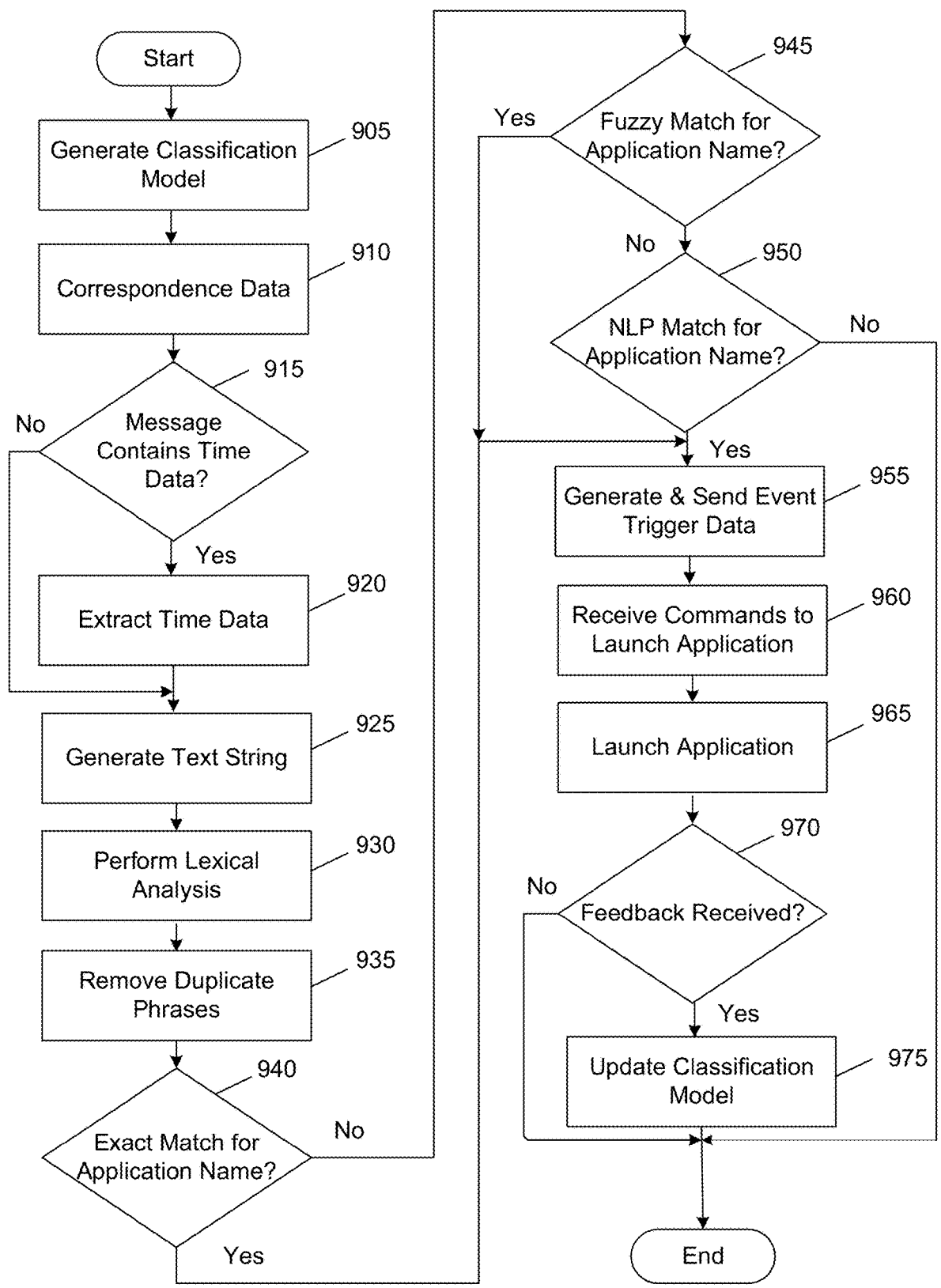
FIG. 9 depicts an illustrative method flowchart for automated application launching in accordance with one or more example embodiments.

FIG. 9 depicts an illustrative method flowchart for automated application launching in accordance with one or more example embodiments. Referring to FIG. 9, at step 905, a computing device having at least one processor, a communication interface, and memory may generate a text classification model that may be used to extract message data such as application name, time, or the like. At step 910, the computing device may receive a message. At step 915, the computing device may determine whether the message contains time data. If the message does not contain time data, the computing device may proceed to step 925. If the computing device does contain time data, the computing device may proceed to step 920.

At step 920, the computing device may extract the time data. At step 925, the computing device may generate a text string based on the subject and content of the received message. At step 930, the computing device may perform lexical analysis on the text string to separate the text string into one or more phrases. At step 935, the computing device may remove duplicates from the one or more phrases. At step 940, the computing device may determine whether there is an exact match between any of the one or more phrases and an application name stored in the text classification model. If there is an exact match, the computing device may proceed to step 955. If there is not an exact match, the computing device may proceed to step 945.

At step 945, the computing device may apply one or more fuzzy matching techniques to determine a match between any of the one or more phrases and an application name stored in the text classification model. If there is a match, the computing device may proceed to step 955. If there is not match, the computing device may proceed to step 950.

At step 950, the computing device may apply natural language processing to determine a match between the one or more phrases and an application name stored in the text classification model. If a match is not determined, the method may end. If a match is determined, the computing device may proceed to step 955.

At step 955, the computing device may generate and send event trigger data to a cloud computing platform indicating the extracted time and the extracted application. At step 960, the computing device may receive one or more commands from the cloud computing platform directing the computing device to launch the application specified in event trigger data. At step 965, the computing device may launch the application in response to the one or more commands directing the computing device to launch the application. At step 970, the computing device may determine whether any feedback information was received regarding the launch of the application. If not, the method may end. If feedback information was received, the computing device may proceed to step 975. At step 975, the computing device may update the text classification model used to extract the application and the time based on the feedback information.

The following paragraphs (M1) through (M9) describe examples of methods that may be implemented in accordance with the present disclosure.

(M1) A method comprising: receiving a message from a client device, the message indicative of an application for a given event and a time in which to launch the application for the given event; generating a plurality of text strings based on content of the message; identifying the application based on a comparison of the plurality of text strings with one or more entries of a database of applications; and launching the application in response to the identification of the application and at the time indicated in the received message, so as to make ready the application for use for the given event.

(M2) A method may be performed as described in paragraph (M1) wherein the generation of the plurality of text strings includes use of a combination of text from a subject line of the message and text from a body of the message to form at least one text string.

(M3) A method may be performed as described in any of paragraphs (M1) and (M2) wherein the message is one of: an email message, a text message, a meeting invitation, an electronic task alert, or an email attachment.

(M4) A method may be performed as described in any of paragraphs (M1) through (M3), further comprising removing duplicate text strings from the plurality of text strings.

(M5) A method may be performed as described in any of paragraphs (M1) through (M4) further comprising determining a match between at least one text string of the plurality of text strings and an entry of the database of applications, and the match being indicative of the application.

(M6) A method may be performed as described in any of paragraphs (M1)-(M5) further comprising: determining that at least one text string does not exactly match any of the entries of the database of applications; and determining a partial match of the at least one text string with an entry of the database of applications based on a comparison of a portion of at least one text string with at least one entry of the database of applications.

(M7) A method may be performed as described in paragraph (M6), wherein the identification of the application is based on a partial match of at least one text string with an entry of the database of applications.

The following paragraphs (A1) through (A9) describe examples of computing devices that may be implemented in accordance with the present disclosure.

(A1) A computing device comprising: a memory; and at least one processor coupled to the memory and configured to: receive a message from a client device, the message indicative of an application for a given event and a time in which to launch the application for the given event; generate a plurality of text strings based on content of the message; identify the application based on a comparison of the plurality of text strings with one or more entries of a database of applications; and launch the application in response to the identification of the application and at the time indicated in the received message, so as to make ready the application for use for the given event.

(A2) A computing device as described in paragraph (A1) wherein the generation of the plurality of text strings includes use of a combination of text from a subject line of the message and text from a body of the message to form at least one text string.

(A3) A computing device as described in any one of paragraphs (A1) and (A2) wherein the message is one of: an email message, a text message, a meeting invitation, an electronic task alert, or an email attachment.

(A4) A computing device as described in any one of paragraphs (A1) through (A3) wherein the at least one processor is further configured to remove duplicate text strings from the plurality of text strings.

(A5) A computing device as described in any one of paragraphs (A1)-(A4) wherein the at least one processor is further configured to determine a match between at least one text string of the plurality of text strings and an entry of the database of applications, and the match being indicative of the application.

(A6) A system as described in any one of paragraphs (A1)-(A6) wherein the at least one processor is further configured to: determine that at least one text string does not exactly match any of the entries of the database of applications; and determine a partial match of the at least one text string with an entry of the database of applications based on a comparison of a portion of at least one text string with at least one entry of the database of applications.

(A7) A computing device as described in paragraph (A6) wherein the identification of the application is based on a partial match of at least one text string with an entry of the database of applications.

The following paragraphs (CRM1) and (CRM2) describe examples of computer-readable media that may be implemented in accordance with the present disclosure.

(CRM1) One or more non-transitory computer-readable media storing instructions that, when executed by a system comprising at least one processor, a communication interface, and memory, cause the system to: receive a message from a client device, the message indicative of an application for a given event and a time in which to launch the application for the given event; generate a plurality of text strings based on content of the message; identify the application based on a comparison of the plurality of text strings with one or more entries of a database of applications; and launch the application in response to the identification of the application and at the time indicated in the received message, so as to make ready the application for use for the given event.

(CRM2) One or more non-transitory computer-readable media as described in paragraph (CRM1) wherein the generation of the plurality of text strings includes use of a combination of text from a subject line of the message and text from a body of the message to form at least one text string.

(CRM3) One or more non-transitory computer-readable media as described in any one of paragraphs (CRM1) and (CRM2), wherein the message is one of: an email message, a text message, a meeting invitation, an electronic task alert, or an email attachment.

(CRM4) One or more non-transitory computer-readable media as described in any one of paragraphs (CRM1) through (CRM3), wherein the at least one processor is further configured to remove duplicate text strings from the plurality of text strings.

(CRM5) One or more non-transitory computer-readable media as described in any one of paragraphs (CRM1) through (CRM4) wherein the at least one processor is further configured to determine a match between at least one text string of the plurality of text strings and an entry of the database of applications, and the match being indicative of the application.

(CRM6) One or more non-transitory computer-readable media as described in any one of paragraphs (CRM1)-(CRM5), wherein the at least one processor is further configured to: determine that at least one text string does not exactly match any of the entries of the database of applications; and determine a partial match of the at least one text string with an entry of the database of applications based on a comparison of a portion of at least one text string with at least one entry of the database of applications.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A computing device comprising:
   a memory; and
   at least one processor coupled to the memory and configured to:
      receive a message from a client device, the message including content indicative of a given event, a time at which the given event is to occur, and a plurality of applications, the plurality including a first application and a second application;
      generate a plurality of text strings based on content of the message, at least one text string being a combination of text from a subject and content of the received message;
      remove duplicate text strings from the plurality of text strings, wherein removing the duplicate text strings comprises:
         identifying that one or more text strings of the plurality of text strings included in the message are duplicates; and
         removing, from the plurality of text strings, the duplicate text strings;
      identify the first application based on a comparison of the plurality of text strings with one or more entries of a database of applications, wherein identifying the first application comprises using one or more fuzzy matching techniques to identify the first application from the plurality of text strings, wherein the plurality of text strings do not include a name of either the first application or the second application, wherein the one or more fuzzy matching techniques fail to identify the second application, and wherein identifying the first application comprises identifying a word processing application;

identify, after using the one or more fuzzy matching techniques, the second application, wherein identifying the second application comprises using one or more natural language processing techniques to identify a context corresponding to the plurality of text strings, wherein identifying the second application comprises identifying, based on the context, the second application, and wherein identifying the second application comprises identifying a spreadsheet application; and in response to the identification of the first application and the second application, receive at least one command from a cloud computing platform to launch the first application and the second application at the time indicated in the received message, so as to make ready the first application and the second application to accomplish the given event, wherein the command is received in response to event trigger data sent to the cloud computing platform.

2. The computing device of claim 1, wherein the generation of the plurality of text strings includes use of a combination of text from a subject line of the message and text from a body of the message to form at least one text string.

3. The computing device of claim 1, wherein the message is an electronic meeting invitation.

4. The computing device of claim 3, wherein the time comprises a predetermined period of time prior to a time of a meeting indicated in the electronic meeting invitation.

5. The computing device of claim 1, wherein the at least one processor is further configured to determine a match between at least one text string of the plurality of text strings and an entry of the database of applications, and the match being indicative of the first application.

6. The computing device of claim 1, wherein the at least one processor is further configured to:
   determine that at least one text string does not exactly match any of the entries of the database of applications; and
   determine a partial match of the at least one text string with an entry of the database of applications based on a comparison of a portion of at least one text string with at least one entry of the database of applications.

7. The computing device of claim 6, wherein the identification of the first application is based on a partial match of at least one text string with an entry of the database of applications.

8. The computing device of claim 1, wherein identifying the first application based on the comparison of the plurality of text strings with the one or more entries of the database of applications comprises:
   identifying a first application name and a second application name by identifying that the plurality of text strings comprises an exact match with the first application name and does not comprise an exact match with the second application name;
   generating a first confidence score indicating that the first application name matches the plurality of text strings and a second confidence score indicating that the second application name does not match the plurality of text strings, wherein the first confidence score is higher than the second confidence score;
   comparing the first confidence score and the second confidence score to a confidence threshold;
   based on identifying that the first confidence score exceeds the confidence threshold, identifying that the plurality of text strings includes the first application name and that an application corresponding to the first application name should be launched;
   based on identifying that the second confidence score does not exceed the confidence threshold, performing a fuzzy matching algorithm to identify whether an application corresponding to the second application name should be launched, wherein performing the fuzzy matching algorithm updates the second confidence score based on the fuzzy matching algorithm;
   comparing the updated second confidence score to the confidence threshold; and
   based on identifying that the updated second confidence score exceeds the confidence threshold, identifying the application corresponding to the second application name should be selected.

9. The computing device of claim 1, wherein launching the application comprises launching, at a different client device, one or more of: the first application or the second application.

10. The computing device of claim 1, wherein the at least one processor is further configured to:
    receive feedback indicating that the first application or the second application that is launched is correct; and
    update a text classification model based on the feedback.

11. A method comprising:
    receiving a message from a client device, the message including content indicative of a given event, a time at which the given event is to occur, and a plurality of applications, the plurality including a first application and a second application;
    generating a plurality of text strings based on content of the message, at least one text string being a combination of text from a subject and content of the received message;
    remove duplicate text strings from the plurality of text strings, wherein removing the duplicate text strings comprises:
       identifying that one or more text strings of the plurality of text strings included in the message are duplicates; and
       removing, from the plurality of text strings, the duplicate text strings;
    identifying the first application based on a comparison of the plurality of text strings with one or more entries of a database of applications, wherein identifying the first application comprises using one or more fuzzy matching techniques to identify the first application from the plurality of text strings, wherein the plurality of text strings do not include a name of either the first application or the second application, wherein the one or more fuzzy matching techniques fail to identify the second application, and wherein identifying the first application comprises identifying a word processing application;
    identifying, after using the one or more fuzzy matching techniques, the second application, wherein identifying the second application comprises using one or more natural language processing techniques to identify a context corresponding to the plurality of text strings, wherein identifying the second application comprises identifying, based on the context, the second application, and wherein identifying the second application comprises identifying a spreadsheet application; and in response to the identification of the first application and the second application, receiving at least one command from a cloud computing platform for launching the first application and the second application at the time indicated in the received message, so as to make ready the first application and the second application to accomplish the given event, wherein the command is received in response to event trigger data sent to the cloud computing platform.

12. The method of claim 11, wherein the generation of the plurality of text strings includes use of a combination of text from a subject line of the message and text from a body of the message to form at least one text string.

13. The method of claim 11, wherein the message is an electronic meeting invitation.

14. The method of claim 11, further comprising determining a match between at least one text string of the plurality of text strings and an entry of the database of applications, and the match being indicative of the first application.

15. The method of claim 11, further comprising:
determining that at least one text string does not exactly match any of the entries of the database of applications; and
determining a partial match of the at least one text string with an entry of the database of applications based on a comparison of a portion of at least one text string with at least one entry of the database of applications.

16. The method of claim 15, wherein the identification of the first application is based on a partial match of at least one text string with an entry of the database of applications.

17. The method of claim 11, wherein launching the application comprises launching, at a different client device, one or more of: the first application or the second application.

18. One or more non-transitory computer-readable media storing instructions that, when executed by a system comprising at least one processor, a communication interface, and memory, cause the system to:
receive a message from a client device, the message including content indicative of a given event, a time at which the given event is to occur, and a plurality of applications, the plurality including a first application and a second application;
generate a plurality of text strings based on content of the message, at least one text string being a combination of text from a subject and content of the received message;
remove duplicate text strings from the plurality of text strings, wherein removing the duplicate text strings comprises:
identifying that one or more text strings of the plurality of text strings included in the message are duplicates; and
removing, from the plurality of text strings, the duplicate text strings;
identify the first application based on a comparison of the plurality of text strings with one or more entries of a database of applications, wherein identifying the first application comprises using one or more fuzzy matching techniques to identify the first application from the plurality of text strings, wherein the plurality of text strings do not include a name of either the first application or the second application, wherein the one or more fuzzy matching techniques fail to identify the second application, and wherein identifying the first application comprises identifying a word processing application;
identify, after using the one or more fuzzy matching techniques, the second application, wherein identifying the second application comprises using one or more natural language processing techniques to identify a context corresponding to the plurality of text strings, wherein identifying the second application comprises identifying, based on the context, the second application, and wherein identifying the second application comprises identifying a spreadsheet application; and
in response to the identification of the first application and the second application, receive at least one command from a cloud computing platform to launch the first application and the second application at the time indicated in the received message, so as to make ready the first application and the second application to accomplish the given event, wherein the command is received in response to event trigger data sent to the cloud computing platform.

* * * * *